(12) United States Patent
Irwin

(10) Patent No.: US 6,393,026 B1
(45) Date of Patent: May 21, 2002

(54) DATA PACKET PROCESSING SYSTEM AND METHOD FOR A ROUTER

(75) Inventor: George F. Irwin, Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/154,628

(22) Filed: Sep. 17, 1998

(51) Int. Cl.[7] ................ H04L 12/28; H04L 12/56
(52) U.S. Cl. ............ 370/401; 370/394; 709/208; 709/238
(58) Field of Search ................ 370/389, 390, 370/392, 393, 394, 400, 401, 402, 412; 709/238, 342, 208, 209, 210, 211, 212

(56) References Cited

U.S. PATENT DOCUMENTS

| | | | |
|---|---|---|---|
| 5,404,550 A | 4/1995 | Horst | |
| 5,586,281 A | 12/1996 | Miyama et al. | |
| 5,636,371 A | 6/1997 | Yu | |
| 5,734,865 A | 3/1998 | Yu | |
| 5,905,723 A * | 5/1999 | Varghese et al. | 370/351 |
| 5,951,649 A * | 9/1999 | Dobbins et al. | 709/238 |
| 5,953,312 A * | 9/1999 | Crawley et al. | 370/218 |
| 6,078,963 A * | 6/2000 | Civanlar et al. | 709/238 |
| 6,259,699 B1 * | 7/2001 | Opalka et al. | 370/398 |

* cited by examiner

Primary Examiner—David R. Vincent
Assistant Examiner—Bob A. Phunkulh

(57) ABSTRACT

A data packet processing system is provided for a router having a multiprocessor architecture comprising a master node and a processor array of multiple slave nodes. A packet switching software of the router is partitioned into a main forwarding program which is loaded in the master node, and a set of procedures which is loaded into the slave nodes. The system assigns to each data packet a program counter which defines a sequence of procedural calls in the main forwarding program. By stepping through the program counter in the master node, each procedural call is forwarded to and executed by one of the slave nodes.

40 Claims, 19 Drawing Sheets

Spatial reuse: Different messages may be simultaneously sent on each ring segment

DATA PACKET PROCESSING SYSTEM AND METHOD FOR A ROUTER

This invention relates to a data packet processing system and method for a router, and more particularly, to a data packet processing system and method for a router which uses a packet switching software for routing data packets between data networks.

BACKGROUND OF THE INVENTION

Generally, a data packet system consists of a number of interconnected data networks that provide for communication among computers using standard protocols. For example all internet transport protocols use the Internet Protocol (IP) to transport data from a source computer to a destination computer. As each computer may be located on a different network, the internet model defines an IP router that interconnects the constituent networks by providing IP datagram forwarding facilities between networks. Forwarding of the IP datagram requires the router to lookup the destination address in a forwarding table to identify which interface the IP datagram is to be forwarded.

The forwarding algorithms used by the router have usually been implemented with packet switching software that typically executes on a general purpose Central Processing Unit (CPU). However, as higher throughput has resulted from the rapid growth in IP datagram traffic, special purpose hardware has become increasingly common with a resulting decrease in flexibility to implement algorithmic changes.

Therefore, it is desirable to provide a system which restores algorithmic flexibility.

FIG. 1 shows an example of a router having forwarding engines at network interfaces. The router 10 consists of a plurality of network interfaces. 12 that are interconnected through a switching fabric 14 that is controlled through a network processor 1G. Each interface 12 may be provisioned with a forwarding engine 18 that processes incoming packets in order to determine which outgoing network interface 12 needs to be accessed through the interconnect structure of the switching fabric 14. By locating the forwarding algorithms at the interface 12, the forwarding engine 18 is required to operate at the wire rate defined by the associated transmission interface. To allow for processing suitable for transmission facilities having wire speeds of OC-12, OC-48, and OC-192, a local version of the forwarding algorithms and data tables found normally in the network processor are downloaded from the network processor 16 to the forwarding engine 18 of the network interface 12. The forwarding engine 18 is optimized for forwarding speed whereas the routing table data management operates at a lower rate of changes occurring to the network configuration. Since the network processor 16 is no longer required to make routing decisions for a data packet, the packet throughput is capable of being scaled with the number of physical interfaces 12. The single point of congestion as formerly experienced with the centralization of the routing algorithms is replaced by multiple processors 12.

Since the forwarding engine 18 interfaces the external trunks to the interconnection structure of the switching fabric 14, two sets of algorithms each serving the respective interface category are required.

FIG. 2 shows an example of the forwarding engine 18. With the forwarding engine 18 residing between the network interface, e.g. a Synchronous Optical Network (SONET) network interface 20 and the switching fabric interface 22, the computing resource that provides the forwarding function for IP requires the flexibility to deal with algorithmic tasks arising from either interface. These tasks require equable sharing of resources amongst input/output (I/O) units 26 in order to process a packet subjected to integrity checks, address lookup, route selection, option processing, flow classification, scheduling, congestion control, and performance monitoring. A simplified representation is illustrated in FIG. 2 where the forwarding program consists of a main program which provides a sequence of instructional calls and decision branches that describe the high level flow of tasks that are required to be executed; and a suite of "procedural calls" that are used by the main program to execute specific algorithms including, e.g. translation, classification and scheduling procedures. The forwarding program runs exclusively on a single central processor unit (CPU) 24 with the packet throughput being limited to the computational throughput of a single processor.

To increase the processing throughput, additional processors are added to a single processor forwarding engine, so as to create a multiprocessor array that uses either asymmetrical or symmetrical program partitioning.

FIG. 3 shows an example of an asymmetrical multiprocessing system 30 using three main processors 32 and two I/O units 34. The asymmetrical multiprocessing system 30 assigns each main processor 32 a particular task, for example, translation processing, classification or scheduling processing. The duration of each task statistically varies as the respective database is searched, consequently, if the load profile for any processor is not well understood, the main processors 32 are typically not uniformly loaded. The technique has been successfully used in workstations whereby one main processor performs I/O processing, another main processor performs display processing, while a third main processor is used for application level programs. The programming complexity is relatively straight forward as each processor has a cohesive set of tasks with simple communications protocols to transfer information to and from the central processor. Consequently standard software development methodology is quite suitable. However, it still suffers from load locality problems among the main processors since it is difficult to assign loads equably among the main processors.

The alternative approach is to use multiple processors without attempting to create a cohesive subdivision of responsibility. FIG. 4 shows an example of a symmetrical multiprocessing system 40 using three main processors 42. In this system, each processor 42 is loaded with the full suite of algorithms, e.g. translation, classification and scheduling processing. Thus, each processor 42 is equally capable of executing any or all functions that are required. The challenge is to determine how the group of processors can equably allocate the processing tasks amongst themselves. Usually the volume of communication required between processors in subdividing and passing results creates communication congestion that prevents the processing capacity from scaling. Typically only 5% to 10% of the processors within an array are effectively increasing the computational capacity beyond a single processor. The level of computational and communication complexity experienced directly translates into software development complexity that requires both the software developer and the compilers to understand parallelism within the application program. Consequently most parallel processing computers have associated high yearly maintenance costs due to the need to have highly qualified programmers available to adapt an application program to the architecture of the computing system. Symmetrical multiprocessing is limited by system level problems that have not successfully resolved the issues of interprocessor communication bandwidth, the lack of data locality, and lack of design methodology.

The issue of data locality has partially been overcome by using increased bandwidth and distributed shared memory in order to eliminate congestion and to provide global access to data. Both of these factors have been addressed by the IEEE standards: P1596-1992, Scalar Coherent Interface; and P1394.2, Serial Express.

The Serial Express standard has evolved from the Scalar Coherent Interface requirements to become an effective interconnect technology that allows the computing network to scale upwards both physically and logically while extending the CPU bus domain to the I/O system. High bandwidth and low latency performance provides for scalability when interconnecting processors whether organized as a ring based grouping or as a switch based clustering of computers. The Serial Express specification IEEE P1394.2 defines a comprehensive set of signals and protocols for high bandwidth, low latency shared memory access that is specifically designed for multiprocessor and I/O attachments. The technology is capable of supporting an infrastructure that provides for multi-gigabit per second connections capable of achieving a higher bandwidth capacity than would normally be associated with a ring topology. The bandwidth expansion is achieved through the ability to transfer different messages on those portions of the ring where collisions would not occur thereby resulting in spatial reuse. With spatial reuse the Serial Express standard has increased the available system bandwidth by a factor of four when compared to the Scalar Coherent Interface use of unidirectional ring topology. FIG. 5 shows an example of the Serial Express in a Ringlet structure 50 having four ring segments 52 using Serial Express interconnect protocols. FIG. 6 shows an example of Serial Express network topologies 60 having a Ringlet 62 and a Cluster 64 which is bridged to the Ringlet 62.

However, neither standard provides a solution to achieving high processor utilization.

It is therefore desirable to provide a system which better overcome the issues of data locality and low processor utilization.

SUMMARY OF THE INVENTION

An object of the present invention is to provide a data packet processing system and method for a router which achieves high processor utilization and has algorithmic flexibility and less data locality problems.

To this end, the present invention uses a data packet processing system for a router having a multiprocessor architecture comprising a master node and a processor array of multiple slave nodes. A packet switching software of the router is partitioned into a main forwarding program which is loaded in the master node, and a set of procedures which is loaded into the slave nodes. The system assigns to each data packet a program counter which defines a sequence of procedural calls in the main forwarding program. By stepping through the program counter in the master node, each procedural call is forwarded to and executed by one of the slave nodes.

In accordance with an aspect of the present invention, there is provided a data packet processing system for a router which uses a packet switching software for routing data packets between data networks. The data packet processing system comprises a master node and a processor array of multiple slave nodes. The master node has a memory for storing a main forwarding program of the packet switching software, and an input/output unit for receiving and transmitting data packets. A processing unit is provided in the master node for assigning a program counter to each data packet when the data packet is received, so that the program counter defines a sequence of procedural calls in the main forwarding program. A transmitter and a receiver are also provided in the master node for transmitting each procedural call to one of the slave nodes in accordance with the program counter, and for receiving responses from the slave nodes. Each slave node has a memory for storing a set of procedures of the packet switching software, and a receiver for receiving procedural calls destined to the slave node. Each slave node is also provided with a processing unit for executing the received procedural calls using the set of procedures loaded in the slave node memory to generate a response to each received procedural call. A transmitter is provided in each slave node for returning the responses to the master node.

In accordance with another aspect of the present invention, there is provided a method for data packet processing for a router which uses a packet switching software for routing data packets between data networks. The method starts by providing a multiprocessor system comprising a master node and a processor array of multiple slave nodes in the router. The packet switching software is partitioned into a main forwarding program and a set of procedures, and the main forwarding program is stored in the master node and the set of procedures is loaded in each slave node. The master node receives data packets, and assigns a program counter to each data packet when the data packet is received so that the program counter defines a sequence of procedural calls in the main forwarding program. Each procedural call is forwarded to one of the slave nodes in accordance with the program counter. The one of the slave nodes receives and executes the procedural call using the set of procedures loaded therein to generate a response, which is returned to the master node. The above steps for processing the program counter is repeated until the program counter reaches its end for each data packet.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
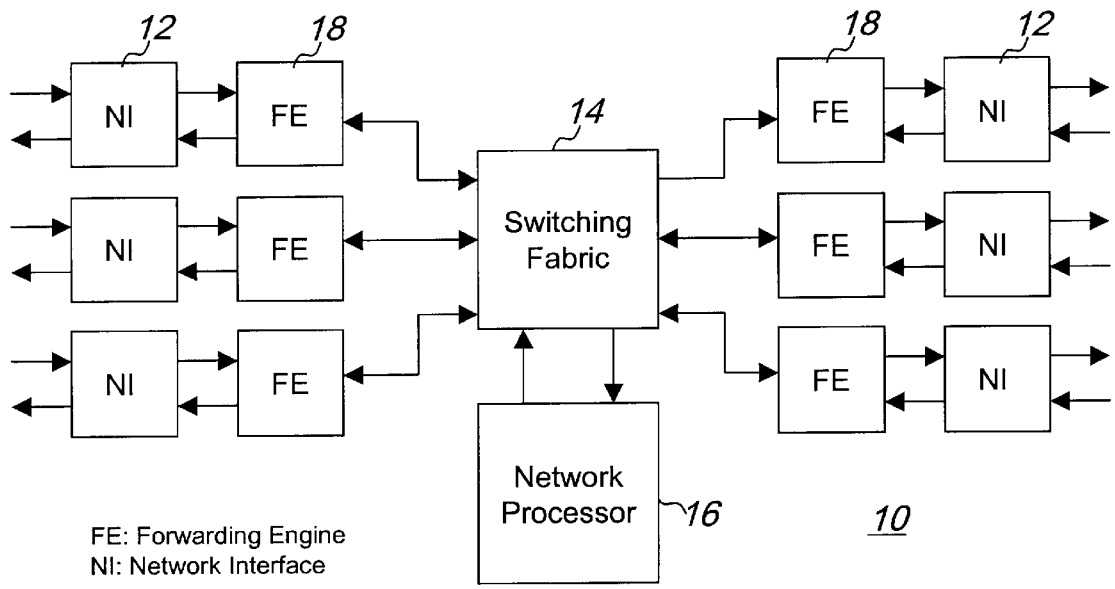
FIG. 1 is a block diagram showing a router with forwarding engines at network interfaces.
Figure 2:
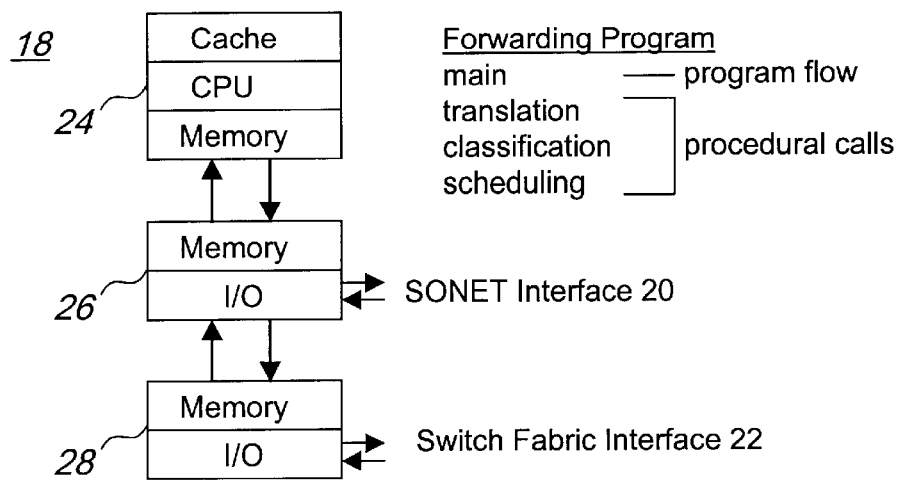
FIG. 2 is a block diagram showing a forwarding engine having a single processor.

A data packet processing system for a router in accordance with the present invention uses a multiprocessor architecture where a sequence of operations is required to be executed to determine a route which an incoming data packet needs to follow in order to reach its destination. These operations are often called tasks, each of which may be viewed as a higher level procedural call, or object. The multiprocessor architecture comprises a master node and a processor array of multiple slave nodes. According to the present invention, rather than dedicating a processor to a single data packet, the data packet processing is distributed to the processor array.

The data packet processing is performed by executing a packet switching software of the router. The processing for forwarding a data packet can be broken into a number of procedures. Typically, packet forwarding requires procedures, such as translation of a header of the data packet to identify suitable routes, classification of a packet flow according to source and destination addresses, type of service route pruning, metric route pruning, policy route pruning, option processing, congestion control, scheduling, and performance monitoring. A data packet may be subjected to all or some subset of these procedures where each procedure is represented by a transaction code.

The packet switching software is partitioned into a main forwarding program and a set of procedures. The main forwarding program describes a processing flow that exists amongst instructional messages that comprise the router behavior. Thus, the main forwarding program defines forwarding algorithms which are used to determine the outgoing route to be followed by the respective data packet.

The main forwarding program is loaded in the master node.

The set of procedures is loaded in each slave node as an object library. Each procedure loaded in each slave node comprises assembly level instruction code. Thus, each procedure may be executed in any slave node.

As each data packet enters the data packet processing system, a program counter is assigned to the packet for the duration of the time the packet is held in the data packet processing system. The program counter uniquely defines a main program flow in the main forwarding program that is executed for the packet to select an output queue of the router for routing the packet. Stepping through the program counter temporarily creates a virtual CPU execution unit, or a hardware thread, for the data packet. Each thread is represented by a thread identification number which is defined by the program counter and a register file used by the process followed for packet processing.

As stepping through the program counter, procedural calls that are driven from the main forwarding program are sent from the master node to the processor array of the slave nodes, of which one slave node will execute any given procedure. Data parameters are usually sent to the processor array together with the procedural calls. Each slave node which received a procedural call executes the called procedure and returns a response containing the execution result to the master node.

As the response is returned to the master node for each procedural call sent to the slave nodes, the program counter at the master node is allowed to increment or branch within the main forwarding program. Stepping through the program counter, an output queue of the router is selected for routing the packet. When packet processing has been completed, the packet has been forwarded to the selected output queue and the thread is made idle or destroyed.

Since the main forwarding program resides at the master node, each of the slave nodes only executes the requested transaction by the procedural call submitted to the respective slave node.

According to the present invention, the data packet processing system has algorithmic flexibility as it does not require any special purpose hardware. Commercially available general purpose processors may be used to form the processor array. The master node may be implemented with either a commercial processor or a specialized ASIC that contains multiple hardware instantiations of the Central Control Unit (CCU) of the master node while sharing the transmission and first-in-first-out (FIFO) facilities.

Figure 3:
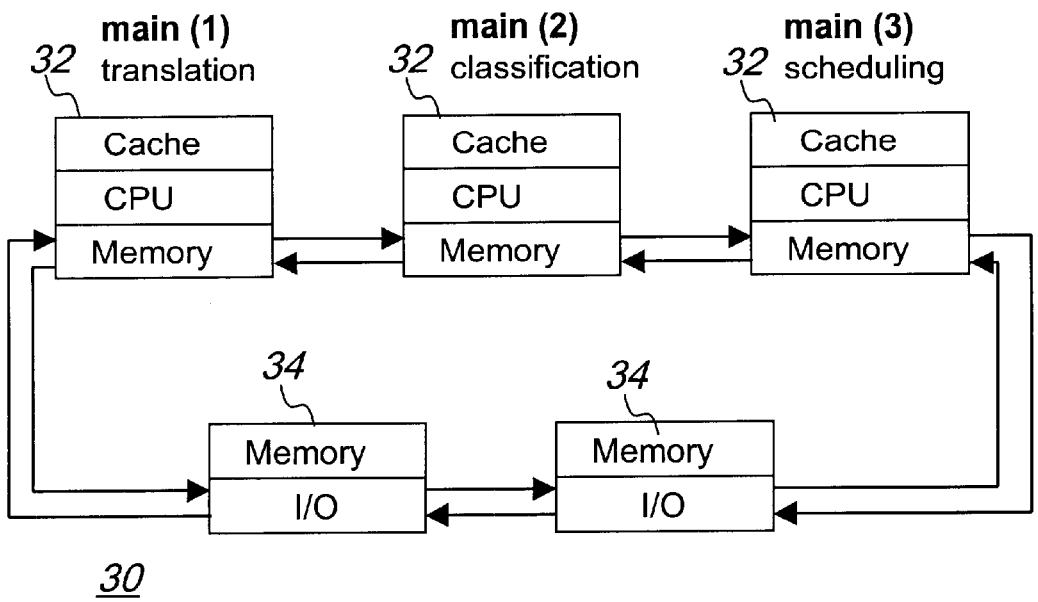
FIG. 3 is a block diagram showing an asymmetrical multiprocessing system.
Figure 4:
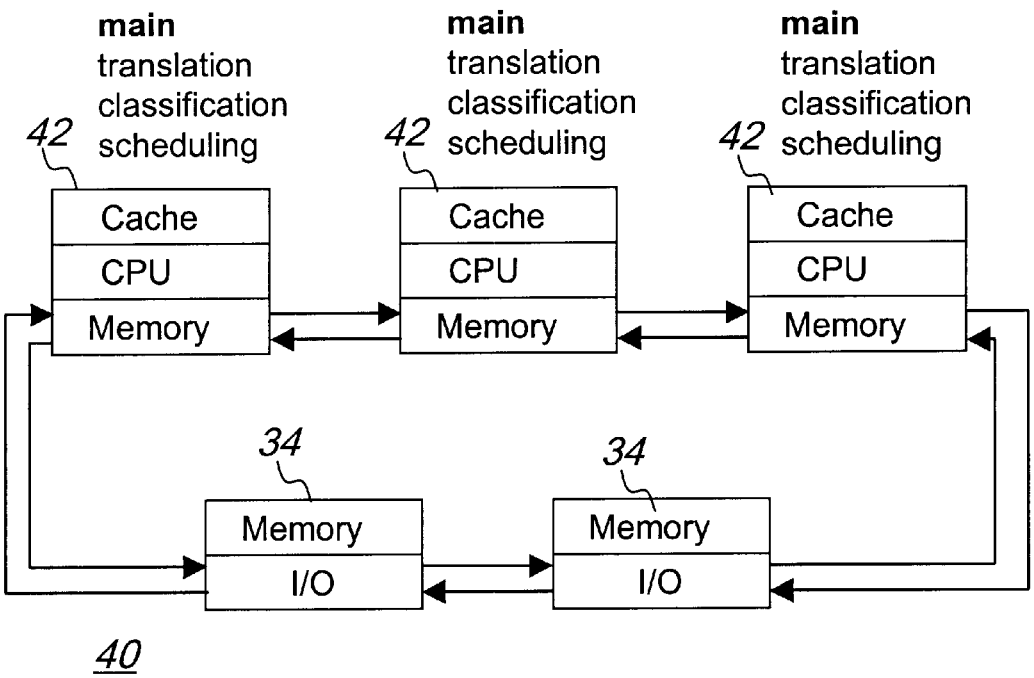
FIG. 4 is a block diagram showing a symmetrical multiprocessing system.
Figure 5:
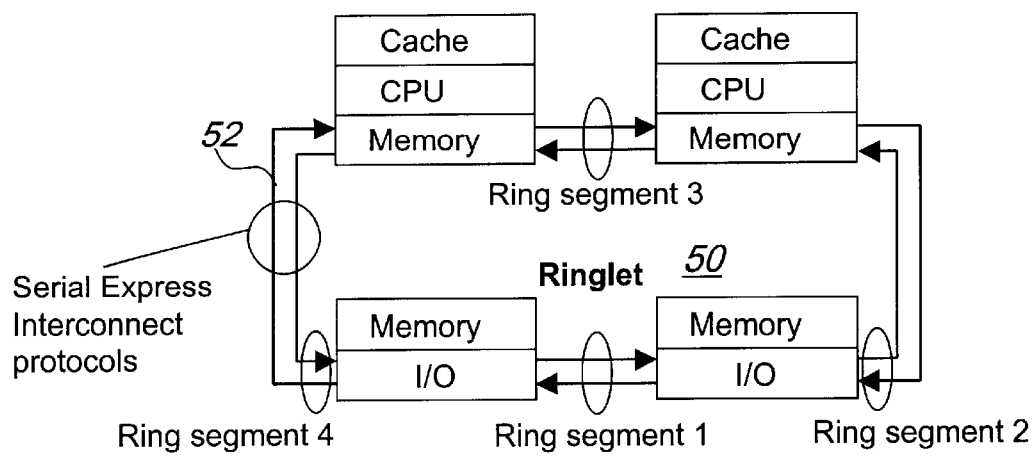
FIG. 5 is a block diagram showing Serial Express in a Ringlet.
Figure 6:
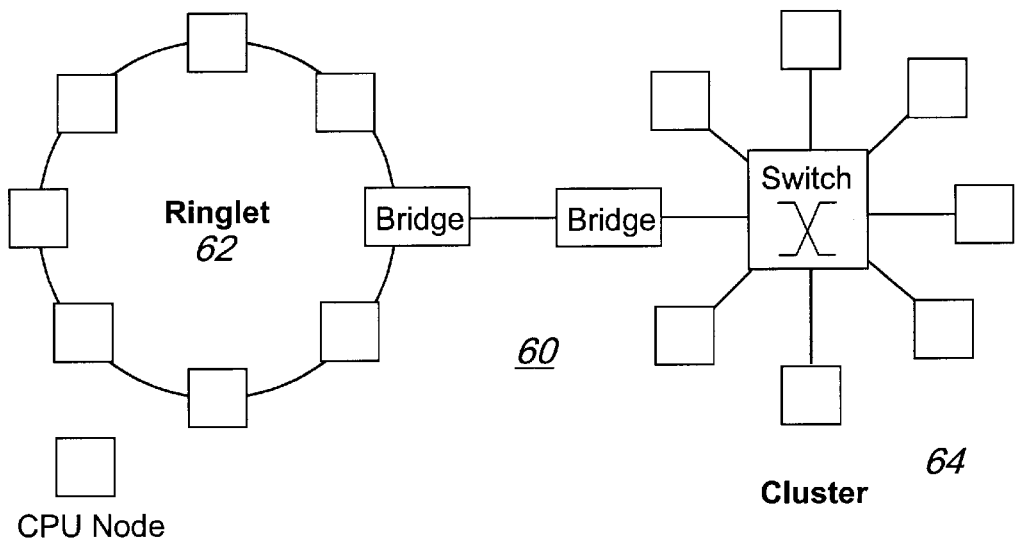
FIG. 6 is a block diagram showing Serial Express Network Topologies.

Also, rather than using the multiprocessor array as main processors as in the asymmetrical or symmetrical multiprocessing systems shown in FIGS. 3 and 4, the present invention uses the multiprocessor array as slave processors. Thus, the locality problems in distributing the packet switch software among the multiple main processors arose in the prior art systems are avoided in the present invention since any procedure may be executed on any slave processor.

When forwarding procedural calls from the master node to the processor array of the slave nodes, it is preferable to allocate each procedural call to a slave node which is least loaded or one of least loaded slave nodes in the processor array. Each slave node acquires a queue of mutually exclusive procedural calls that are to be executed.

For example, the system may use for load distribution a round robbin selection of the next available slave node in order to direct a procedural call. The fill status of each slave node may be returned to the master node with a transaction response, such that a slave node with a queue level of received procedural calls significantly higher than the other slave nodes may be bypassed in the round robbin selection. Thus, least loaded slave nodes may be selected. The system may also directly select least loaded slave nodes in view of the fill status returned by each slave node since the fill level is visible to the master node(s).

Since overall program control resides at the master node, when sequences of procedural calls in the main forwarding program are mutually exclusive of each other, the master node may freely distribute procedural calls from a single thread to a different slave node in order to have that portion of the main forwarding program executed in parallel.

Furthermore, since each packet in the system has a unique program counter, each respective program flow represented by a thread may concurrently exist with those existing threads for the other packets. Thus, multiple threads may concurrently exist such that each thread distributes its sequence of procedural calls across the array of slave nodes. The plurality of threads results in a multithreaded parallel processing capability.

Consequently, procedural calls to be executed by a thread may be uniformly distributed across a parallel processing array of processors that scales in a linear manner.

Furthermore, since the parallel multiprocessing structure is invisible to the software, standard software development processes and compiler technology allow the application to be simply written as a program which is equally capable of executing on a single processor or multiple processors. However, by identifying objects within a program that may be executed in parallel, any thread may advantageously distribute multiple procedural calls simultaneously to the processing array in order to concurrently execute a number of procedures, thus reducing the service time experienced using only a single processor.

When the processing rate of the system is matched or exceeded by a rate of data packet arrivals, the slave nodes have a continuous stream of requests that need to be processed, which results in 100% utilization of the processors.

Figure 7:
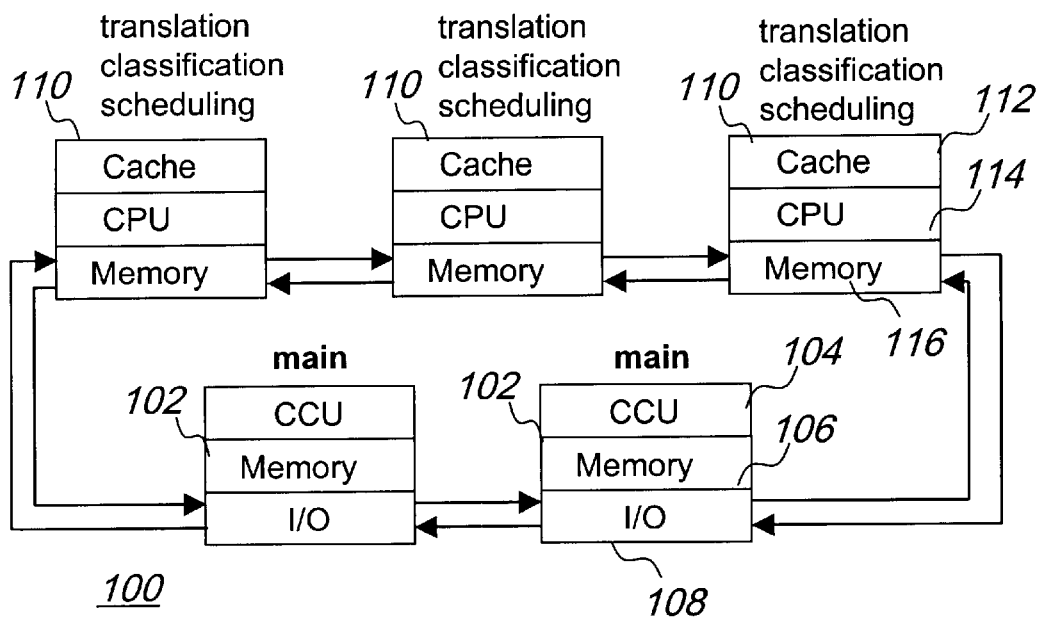
FIG. 7 is a block diagram showing an embodiment of a data packet processing system in accordance with the present invention.

FIG. 7 shows an embodiment of a data packet processing system for a router in accordance with the present invention. The data packet processing system 100 comprises two I/O nodes 102 as master nodes, and a processor array having three computing nodes 110 as slave nodes which are connected to the I/O nodes 102 in a ring topology. Although two master nodes are shown, the system may use a single master node since a single master node has the ability to move data bidirectionally in a ring.

A packet switching software of the router which is executed by the data packet processing system 100 is partitioned into a main forwarding program and a set of procedures comprising assembly language code for the suite of procedural calls. The set of procedures includes translation, classification, scheduling procedures in this embodiment.

The main forwarding program is loaded into a memory 106 of each I/O node 102 which is equipped with an I/O unit 108 and either a CPU or the equivalent of the Central Control Unit (CCU) 104 of a CPU which provides the sequence control through the main forwarding program.

The set of procedures is loaded into a memory 116 of each computing node 110 which is equipped with a CPU 114 and a cache 112.

As a packet enters the system through the I/O node 102, a program counter defining a hardware thread is assigned to the packet, and initialized to the starting location in the main forwarding program. The CCU of the I/O node 102 recognizes that translation and classification procedures need to be performed on a header of the data packet. Consequently, the I/O node 102 forwards a procedural call with header parameters to each of the two least loaded computing nodes 110 that are available in the processor array. As each computing node 110 is responsible for executing the assigned procedure, the procedures are executed in parallel and the results of the transaction are returned to the thread at the I/O node 102 where the program counter is advanced to the next instruction in the program flow of the main forwarding program. With multiple data packet arrivals, the procedural calls for each thread are distributed across the processor array. It is desirable that each computer node 110 of the processor array is provided with an instruction first-in-first-out (FIFO) buffer (not shown) that allows the procedural calls to be queued for execution.

Each computing node consists of a processing unit with memory and a transmission interface.

The transmission interface contains a physical layer and a logical layer that respectively provide for the electrical connection to a ring or cluster topology, and the logical rules that describe how packets are processed for transmission. Both IEEE Standards P1596: Scalar Coherent Interface; and P1394.2: Serial Express specify suitable behaviour that may be used to implement the interconnection of the computing nodes.

Figure 8:
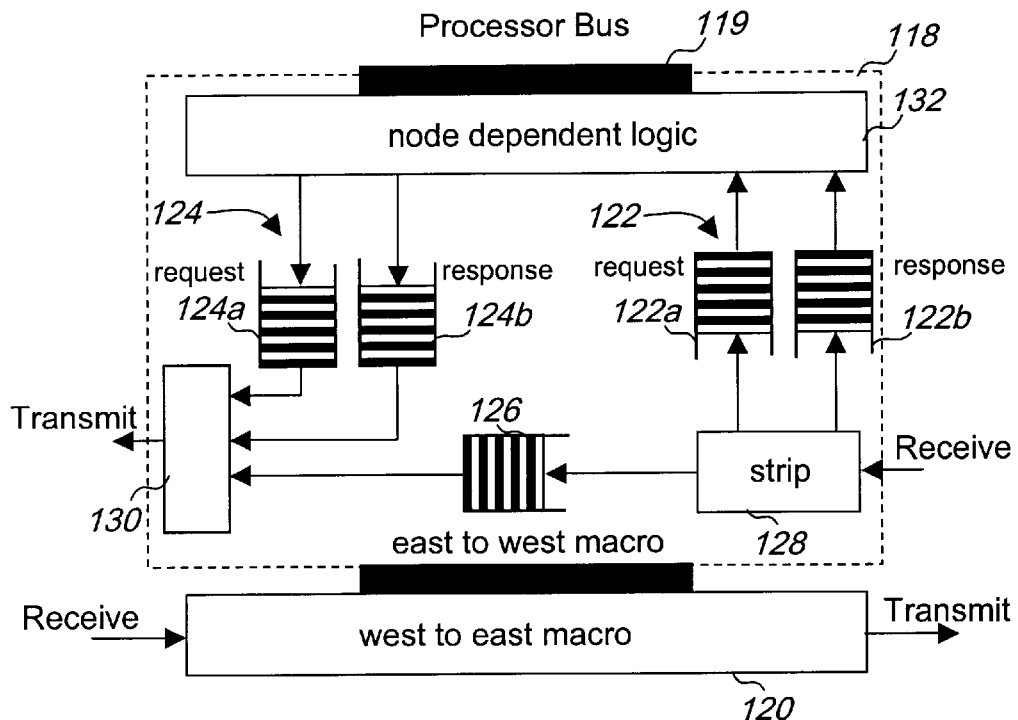
FIG. 8 is a block diagram showing a transmission interface which may be used in a computing node shown in FIG. 7.

FIG. 8 illustrates the P1394.2 functional blocks of a transmission interface that may be used in a computing node for a multiprocessor array used in the present invention. The computing array has an east to west macro 118 and a west to east macro 120 which are connected by a processor bus 119 to a processing unit (not shown). The terms "east" and "west" are used for convenience to indicate two opposite directions in a ring topology.

As shown in FIG. 8, the transmission interface is provided with three levels of FIFO buffering used at each processor, namely, a dual receiver FIFO 122, a dual transmit FIFO 124 and a bypass FIFO 126. The receive FIFO 122 and the transmit FIFO 124 have a request FIFO 122*a*, 124*a* and a response FIFO 122*b*, 124*b*, respectively. The receive FIFO 122 is used to buffer transaction requests, i.e. procedural calls or responses, that are directed to a specific processor that is identified by a transaction identification number (targetID). Requests having a targetID matching with a node identification number (nodeID) of the computing node 120 are routed to the receive FIFO 122 via a stripping unit 128 and are removed from the transmission ring. The received requests are forwarded to a processing unit (not shown) via a processor bus 119 using a node dependent logic 132 for processing the requests. On the other hand, a non-matching targetID would forward the request to either a transmit interface 130 or the bypass FIFO 126 via the stripping unit 128 for subsequent relaying to the next computing node in the ring. The bypass FIFO 126 is used whenever the transmit interface 130 is currently occupied with the transmission of a packet from the node transmit FIFO 124; once the transmission is completed, the bypass FIFO 126 is given access to the transmit interface 130.

The multithreaded, multiprocessor architecture uses the receive FIFO 122 to enqueue a sequence of requests where each request represents a transaction code, a producer identification number (prodID) and a data block. The prodID designates a concurrent process that is represented by a thread that has been created to track the instructional flow being followed in the main forwarding program.

Figure 9:
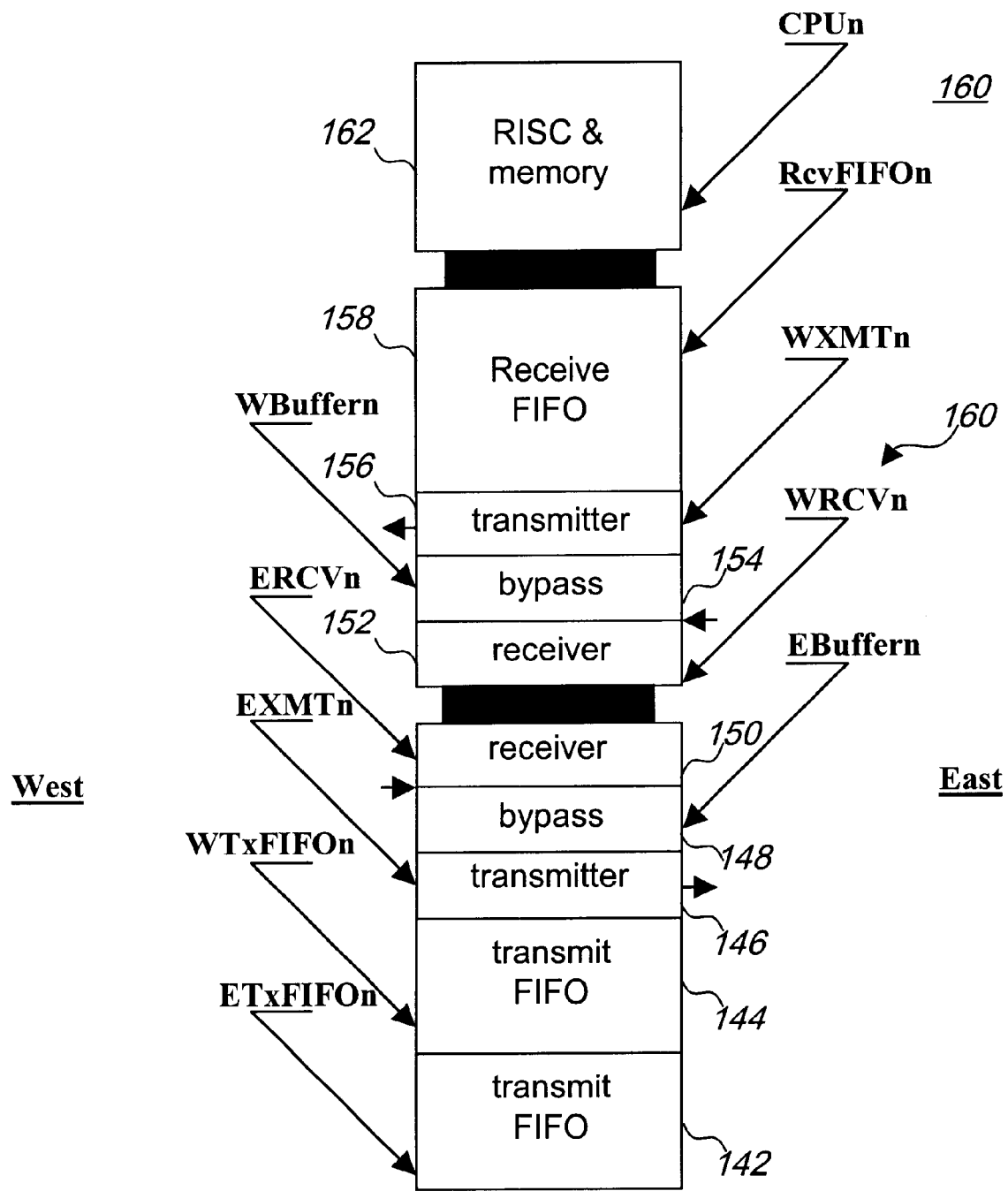
FIG. 9 is a block diagram showing a computing node which may be used in a computing node shown in FIG. 7.

A computing node 140 represented in FIG. 9 contains a simplification of the transmission interface using the dual FIFOs shown in FIG. 8. The dual FIFOs as described in the standard are used for split-response transactions that provide for data transfer integrity by acknowledging each request transaction with a response transaction. As this feature is used in the full implementation and is described in the respective standards, the actual behaviour of the split-response transaction has not been included in the example of FIG. 9.

In FIG. 9, the routing function represented by a transmitter, receiver, and bypass receiver includes a single transmit FIFO 142, 144 for each direction of data flow which is represented by using the terms "east" and "west". A common receive FIFO 158 is used for both the east-west/west-east macro blocks. A Reduced Instruction Set Computer (RISC) with memory 162 is attached to the transmission interface 160 to form a computing node 140. Computing nodes connected in a ringlet use both macros whereas a cluster topology needs use only a single macro without the bypass FIFO.

The master node may have the same structure as the computing node shown in FIG. 9, with an additional I/O interface connected to the RISC.

The receive instruction FIFO may consist of two prioritized FIFOs. A high priority FIFO queues real time tasks associated with determining the forwarding path to be used by a data packet that has been received. A low priority FIFO queues background tasks that are not real time critical, for example, maintenance diagnostics and operational management functions. The background tasks are executed whenever the high priority instruction queue is empty.

Figure 10:
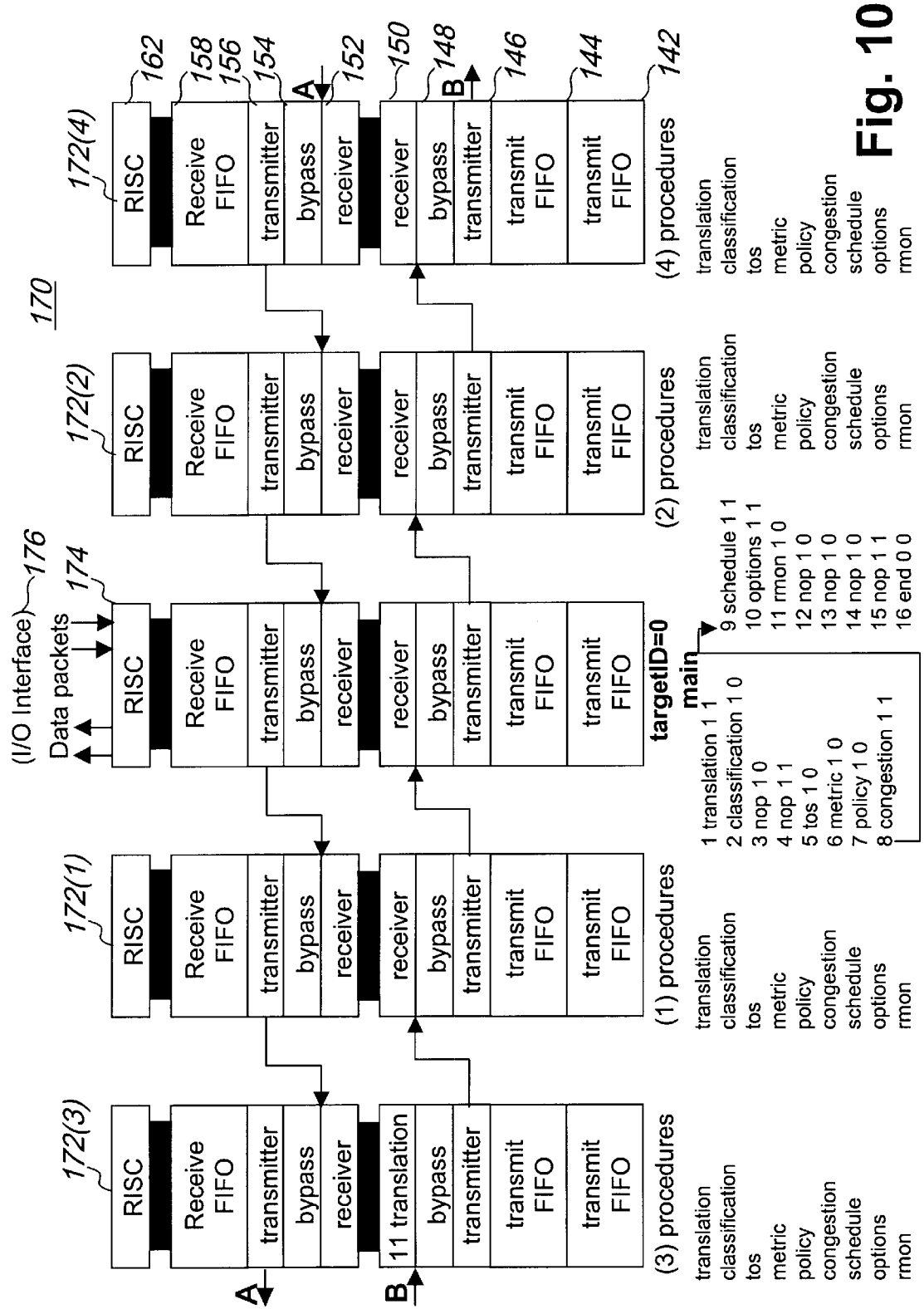
FIG. 10 is a block diagram showing another embodiment of a data packet processing system in accordance with the present invention.

A ringlet model of a data packet processing system 170 for a router shown in FIG. 10 consists of four slave computing nodes 172(1)–172(4) with a single master node 174 that interfaces to an I/O interface 176. An abstraction of the arrival and departure of data packets is shown since the transmission interface is well understood within the IEEE standard. The master node 174 is designated with a target identification of zero. The even numbered slave nodes 172(2) and 172(4) are located to the east of the master node 174: whereas the odd numbered slave nodes 172(1) and 172(3) are located to the west of the master node 174. Each slave node 172(1)–172(4) and the master node 174 has the structure shown in FIG. 9. The "A—A" and "B—B" ports are respectively connected to complete the ring topology for the ringlet.

A main forwarding program is located at the master node 174, and a behavioural code for each procedural call identified in the main forwarding program is located at each slave node 172(1)–172(4). The shortest path is always used to communicate between the master node and the slave nodes.

In this example, the main forwarding program loaded in the master node 174 contains nine procedural calls, each represented as a transaction code followed by a branch value and a suspend flag. The branch value of "1" indicates that the program counter for a given thread increments to the next procedural call. A response received from a procedural call may return a branch value that allows the program counter to go to a procedural call that is elsewhere in the main program. The suspend flag is used to identify a sequence of procedural calls that may be executed concurrently. When the suspend flag is "0", the thread suspends further action until a response of the procedural call is received.

The behavioural code of each procedural call loaded in each slave node 172(1)–172(4) describes the algorithm to be executed whenever the respective transaction request or a procedural call is received at a slave node.

Figure 21:
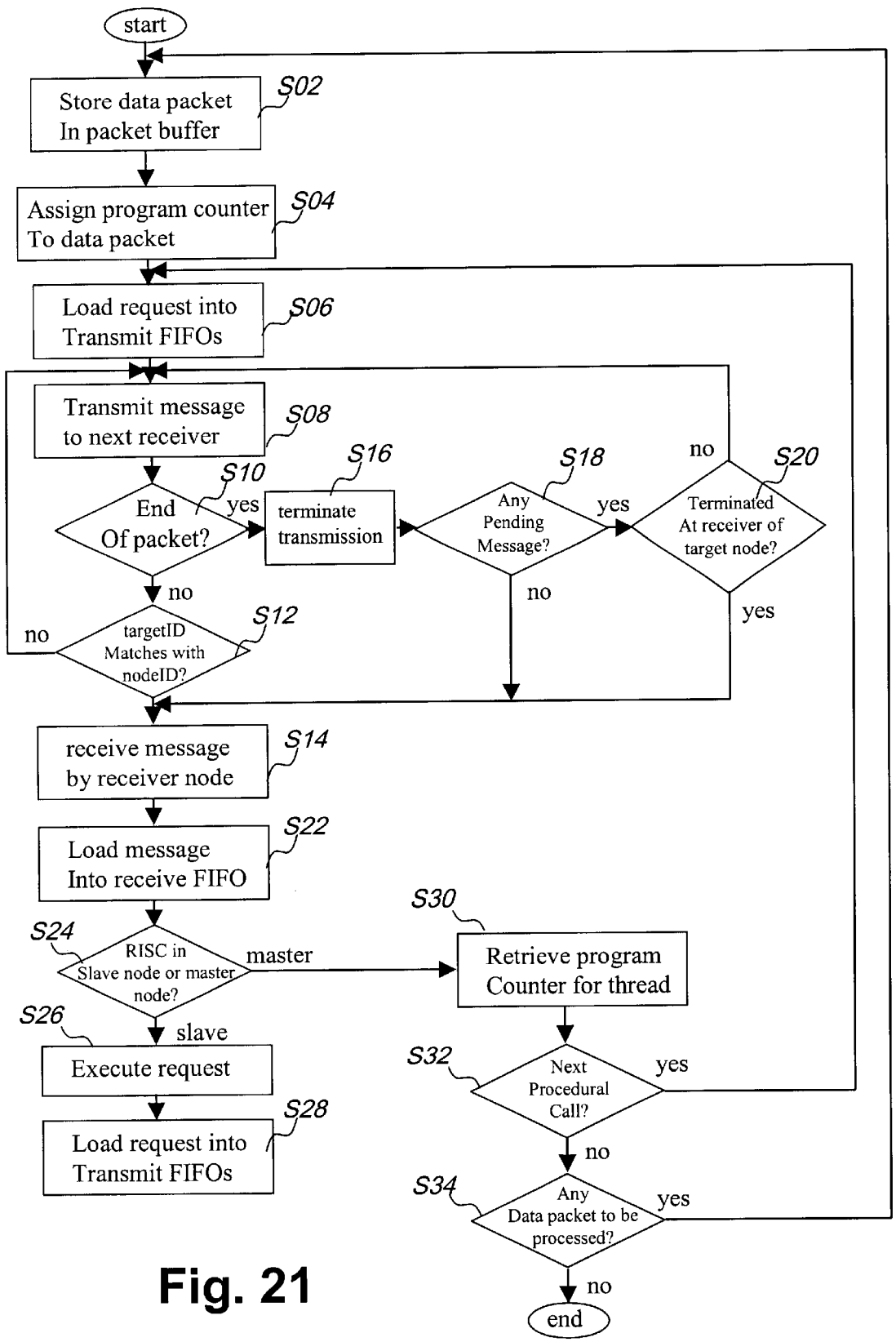
FIG. 21 is a flowchart showing the operation of the data packet processing system shown in FIG. 10.

Referring to FIG. 21, the operation of the data packet processing system of the ringlet topology is described.

As each data packet is received, the master node stores the data packet in a packet buffer (S02), and assigns a program counter to the data packet (S04). The program counter defines a new hardware thread such that the slave nodes are executing a queue of procedural calls or transaction requests made by all the active threads. By the data packet buffer, the master node for a real time system may limit the number of threads that may be created in the system in order to limit the processing latency. A packet arrival rate that exceeds the number of available threads results in the data packet being stored until a thread becomes idle. The hardware thread has a producer identification number and a register file.

Then, the transaction requests are loaded into the respective transmit FIFO (S06).

A message of the transaction request is available for transmission provided the transmit register is idle. If the transmit register is idle, the message is loaded into the transmitter and transmitted to the next receiver in the ringlet (S08).

If the received message is not the end of packet (S10), the receiver node compares a targetID of the incoming message with its node ID (S12). If the two IDs match, the receiver node continues to receive the message (S14). If the two IDs do not match, the message is relayed to the next receiver in the ring (S08).

If the received message is the end of packet (S10), the system terminates the message transmission at the transmitter (S16), and then checks if there is any pending message available in either the transmit FIFO or bypass FIFO (S18). If there is a pending message, and if the pending message did not terminate at a receiver of the target node (S20), then the transmission path is cleared by forwarding the pending message to the next receiver (S08). If there is no pending message (S18) or the pending message terminated at a receiver of the target node (S20), the message is received by the target node (S14).

The received message is loaded into the receive FIFO (S22). If the receive FIFO is at a slave node (S24), the RISC of the slave node executes the requested procedure (S26). Then, a response containing the transaction result is loaded into the transmit FIFO (S28) for transmission (S08). If the receive FIFO is at the master node (S24), the master node retrieves the program counter for the thread (S30). If there is a next procedural call in the main forwarding program (S32), the next procedural call or request is loaded into transmit FIFO (S06) to allow the above sequence of events to be repeated with the next procedure(s). Thus, each thread traces a sequence of procedural calls through the main forwarding program in accordance with the program counter defined by the thread.

When the end procedural call is read and the end of the main forwarding program has been reached (S32), if there is no data packet to be processed (S34), the thread is placed in the queue of idle threads since the packet processing has been completed and the packet has been forwarded to the designated route. If there is a data packet to be processed (S34), the thread is reactivated for a new packet (S02).

In FIG. 21, the term "pending message" is used as an appendant to the start of message whereas the term "end of packet" is used as the appendant to the end of the message. However, the "end of packet" and "pending message" may represent the termination characters that envelope a message. In that case, there is no separate message describing these termination characters to events. For a simplification used to avoid scanning for start of packet and end of packet delimiters, the system may consider the termination characters as messages.

Referring to FIGS. 11–19, an example is described for creating threads and the subsequent execution of the algorithms with the system shown in FIG. 10.

Figure 11:
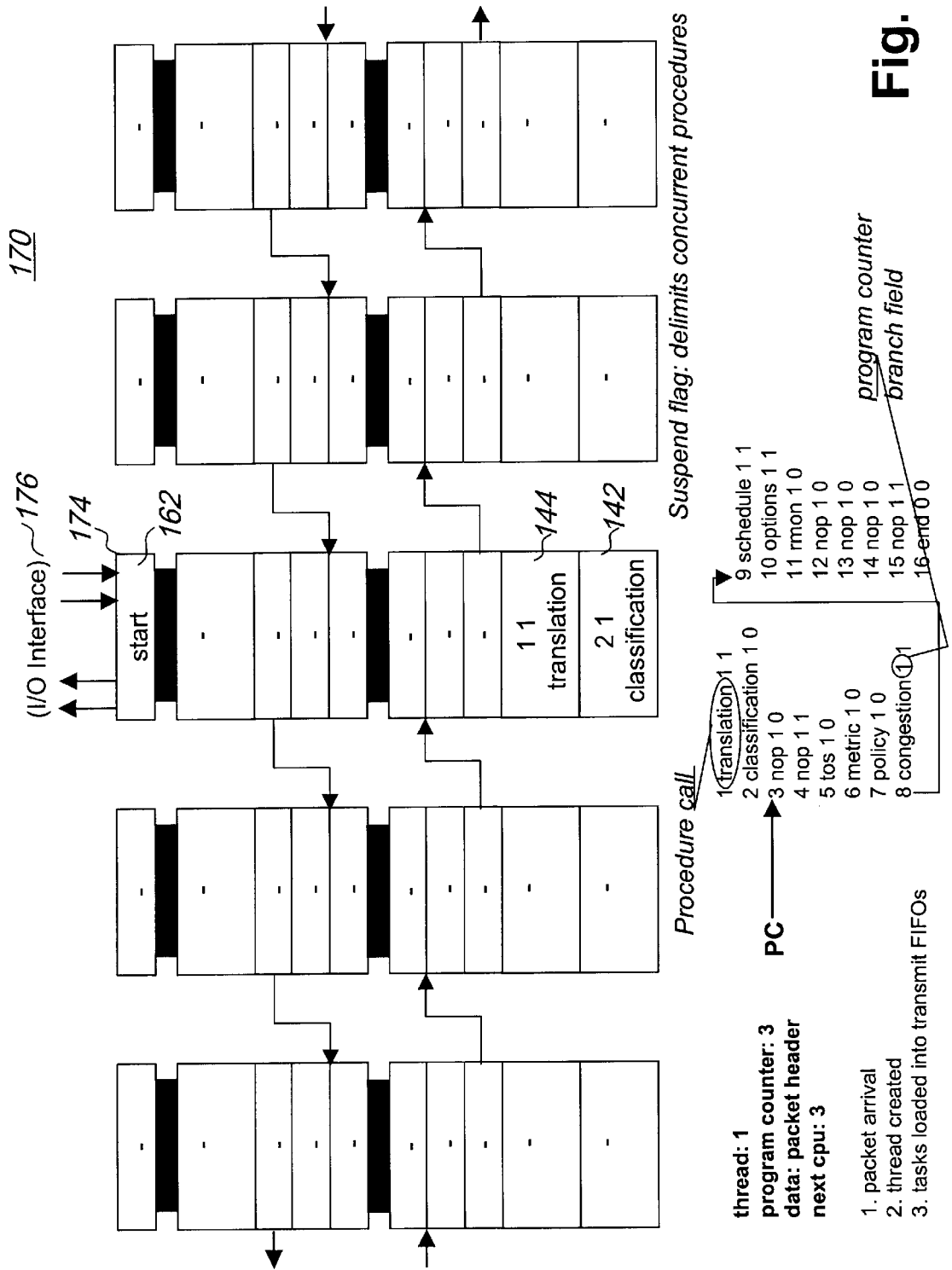
FIG. 11 is a block diagram showing operation of the data packet processing system shown in FIG. 10.

As shown in FIG. 11, when a data packet is received at the I/O interface 176, the master node 174 selects an idle hardware thread identified by its producer ID (prodID) and initializes a program counter created for the thread to a point at memory location 1 of the main forwarding program. The program counter created to associate with the thread reads the main forwarding program and recognizes that two procedural calls, i.e. translation and classification procedural calls, may be simultaneously executed. Consequently, each call designated as a transaction code along with the packet header parameter is loaded into the respective transmit FIFOs 142,144 that are used to communicate with two idle slave nodes that have been selected as target nodes. In this example, the target node for the translation procedural call is slave node 172(1) while the target node for the classification procedural call is slave node 172(2).

The classification procedural call has a negated suspend flag "0". This means that the hardware thread suspends further action until two responses for the translation and classification procedural calls have been received at the master node 174. Each response advances the thread program counter past one of the "nop" (no operation) procedures until the program counter is pointing at the "tos" (type of service) procedure.

Figure 12:
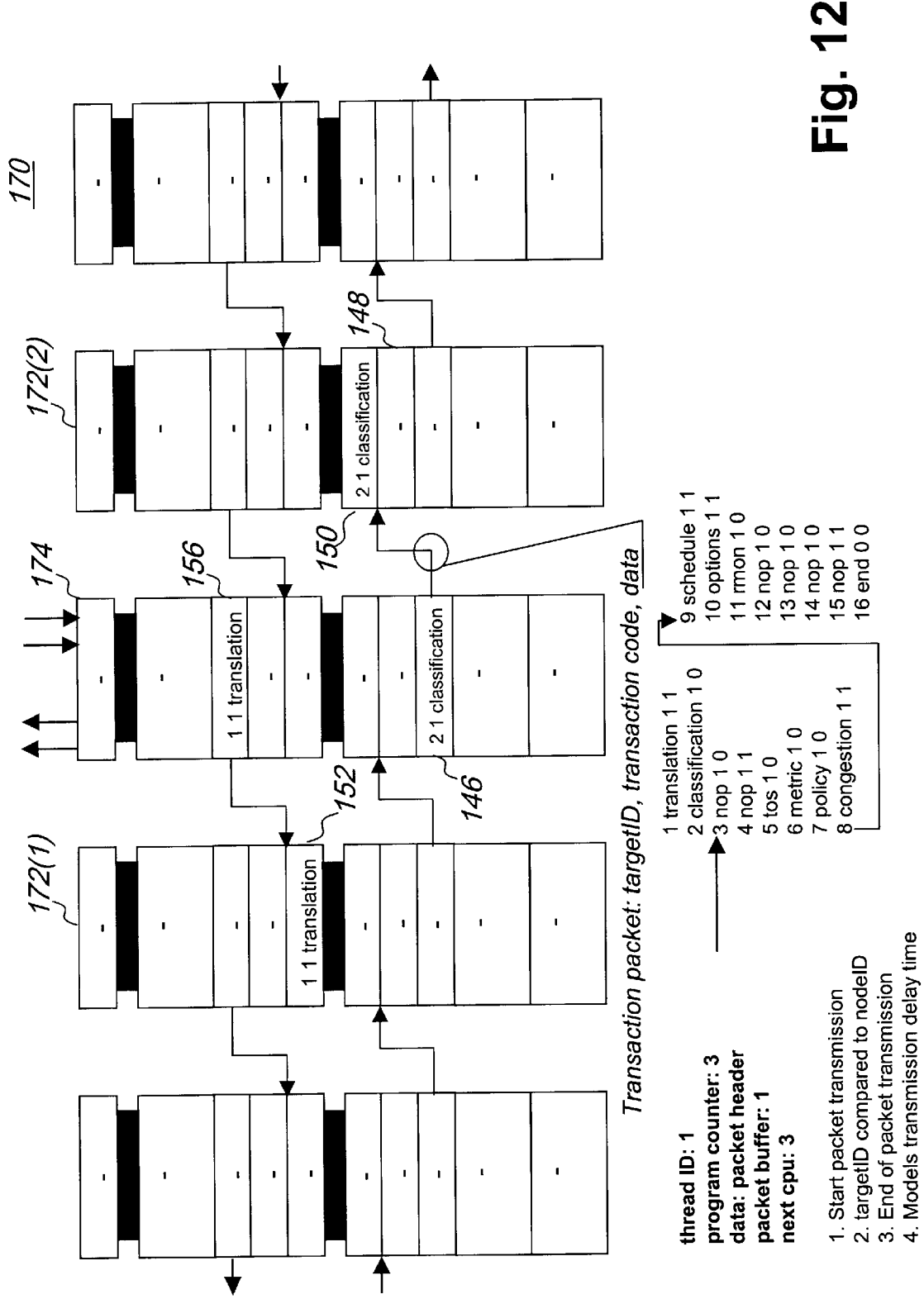
FIG. 12 is a block diagram showing operation of the data packet processing system shown in FIG. 10.

As shown in FIG. 12, the east and west transmitters 146, 156 are loaded with the requests from the transmit FIFO 142, 144. The requests contained in the east and west transmitters 146, 156 are then forwarded to the next receivers 150, 152 in the ring. If the request is destined for a slave node of the current receiver, i.e. the slave node is the target node of the procedural call, the receiver continues to accept the rest of the packet. If the packet was destined for a different slave node, the packet would be diverted through the bypass buffer 148 and relayed by a transmitter of the slave node that is currently receiving the packet for transmission to the next slave node. In this example, the slave nodes 172(1) and 172(2) are the target nodes of the translation and classification requests, respectively, the requests are received by the receivers 150 and 152 of the slave nodes 172(1) and 172(2).

Figure 13:
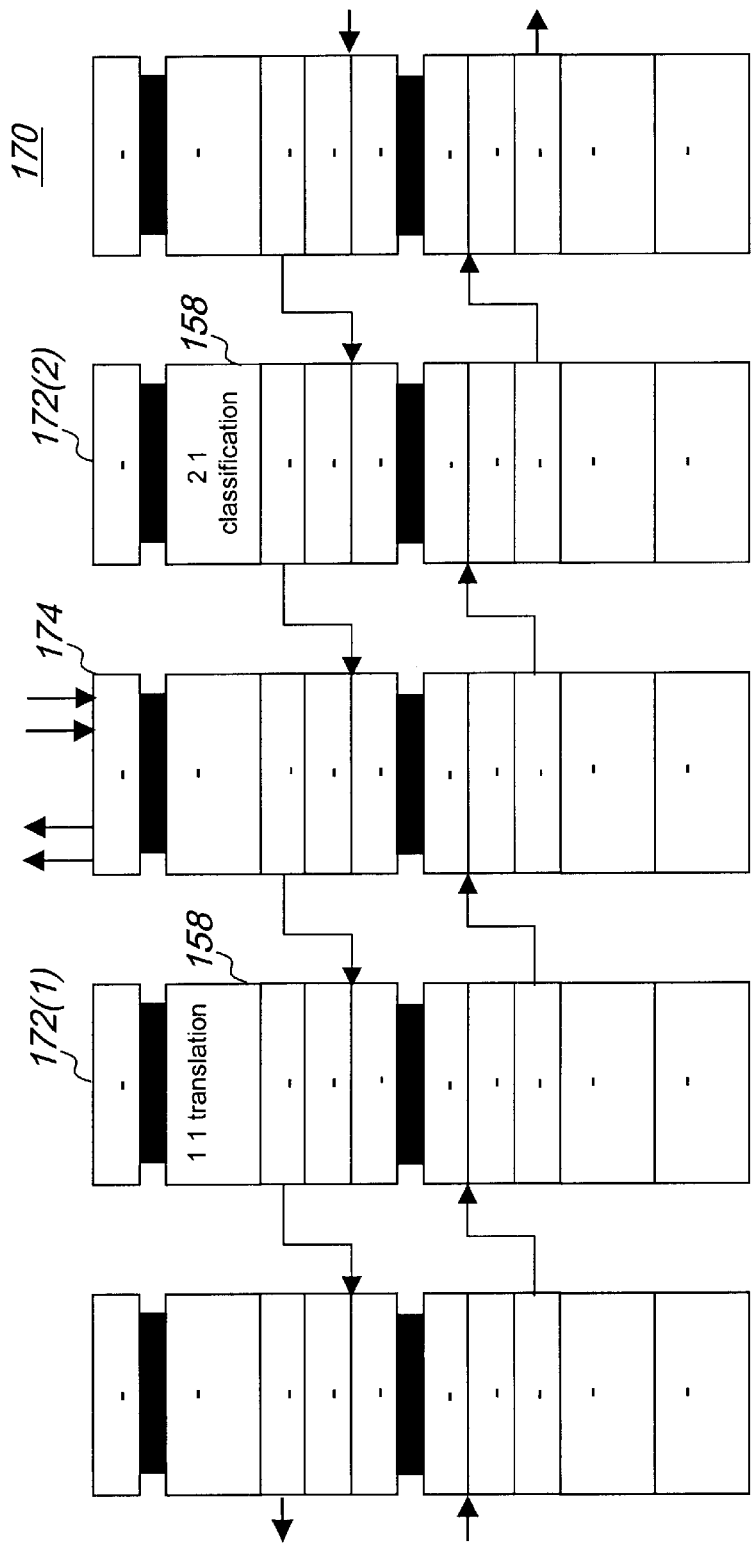
FIG. 13 is a block diagram showing operation of the data packet processing system shown in FIG. 10.

Once each request has been received, the transmission facility is idled and the received request is placed in the receive FIFO 158 of the target node 172(1), 172(2), as shown in FIG. 13.

Figure 14:
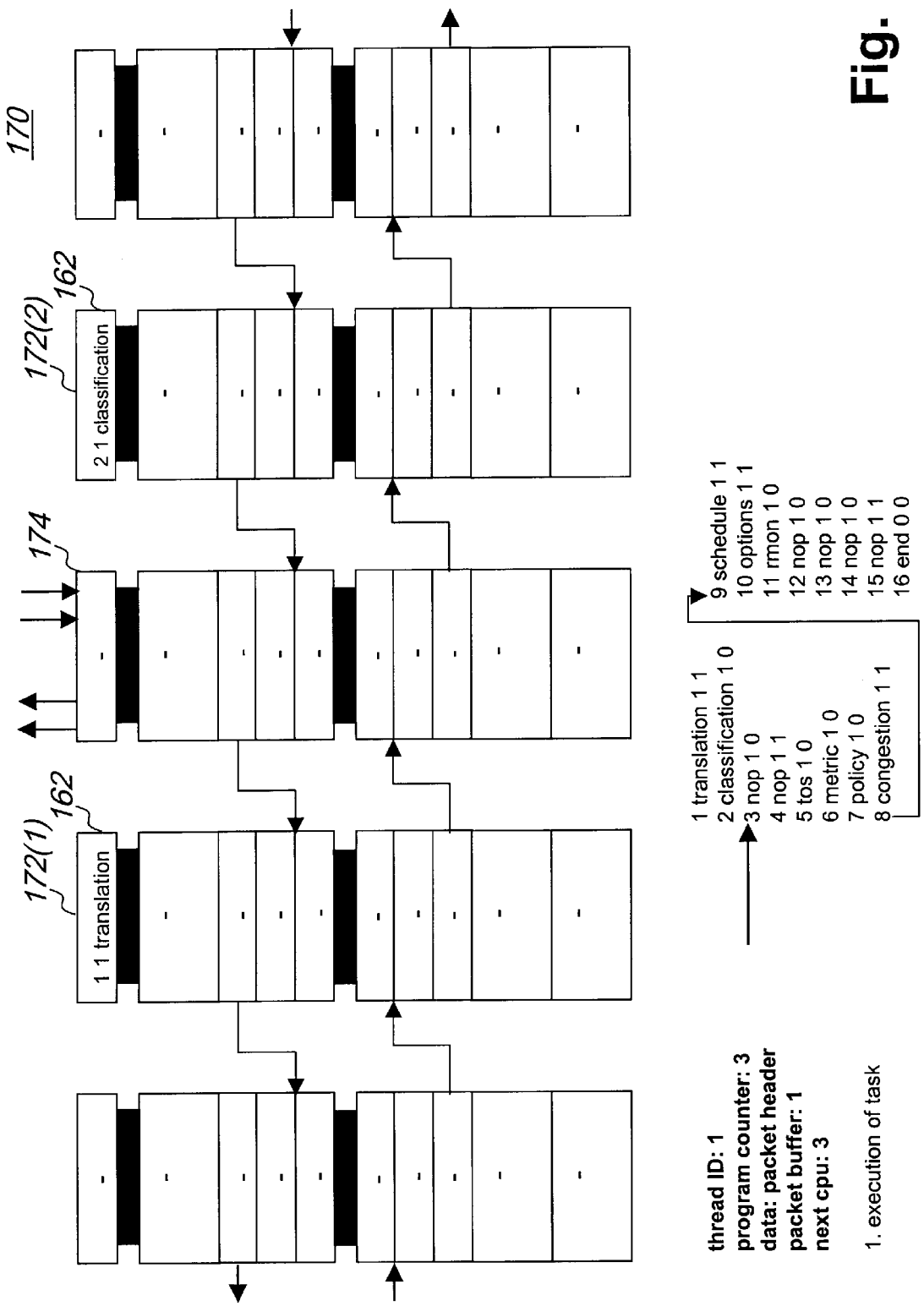
FIG. 14 is a block diagram showing operation of the data packet processing system shown in FIG. 10.

The received request is loaded into the instruction register of the RISC 162 of the target node 172(1), 172(2), as shown in FIG. 14. The procedural code associated with the request is executed thereby translating the data packet header, and classifying the packet according to specified combinations of field within the header.

Figure 15:
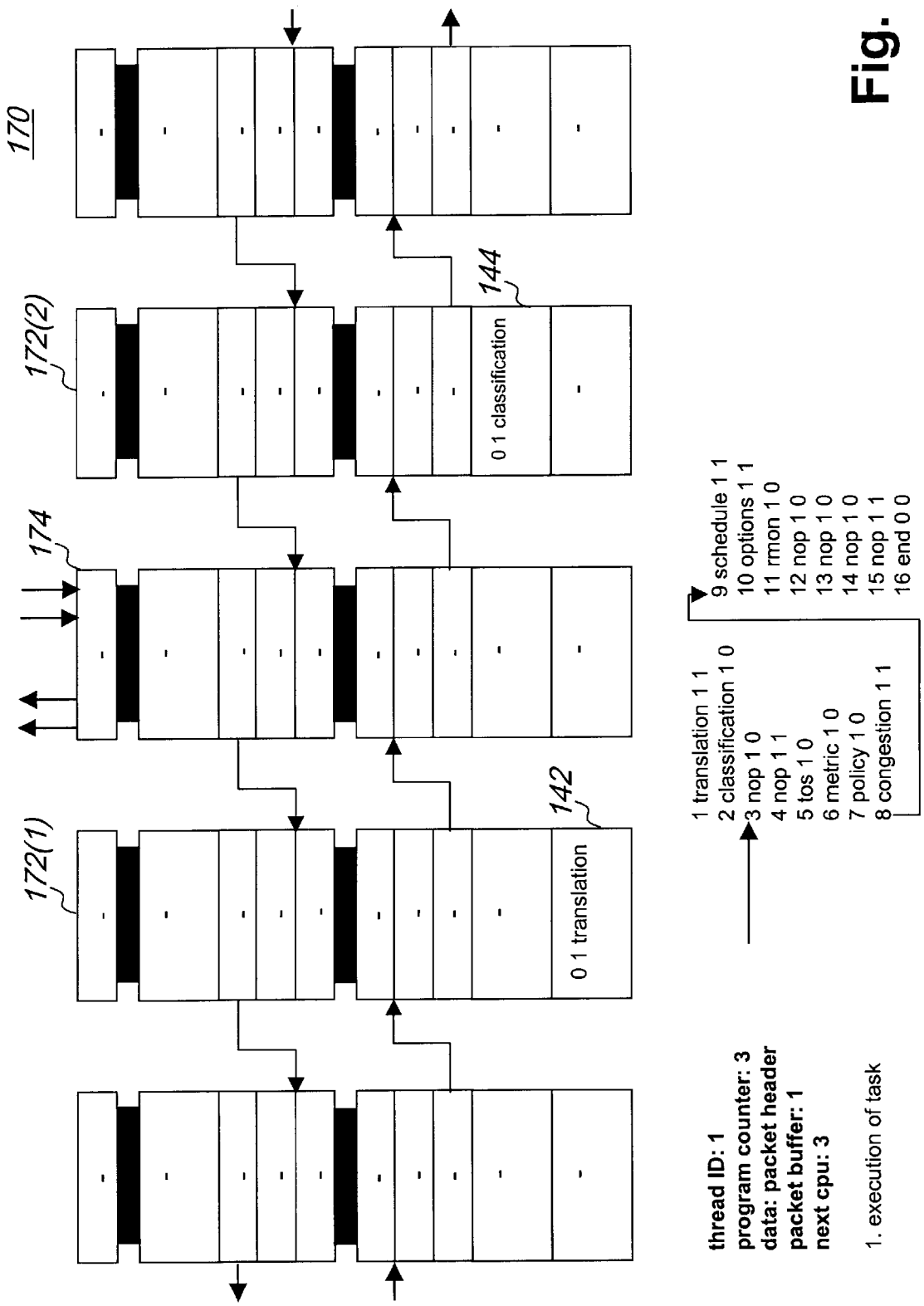
FIG. 15 is a block diagram showing operation of the data packet processing system shown in FIG. 10.
Figure 16:
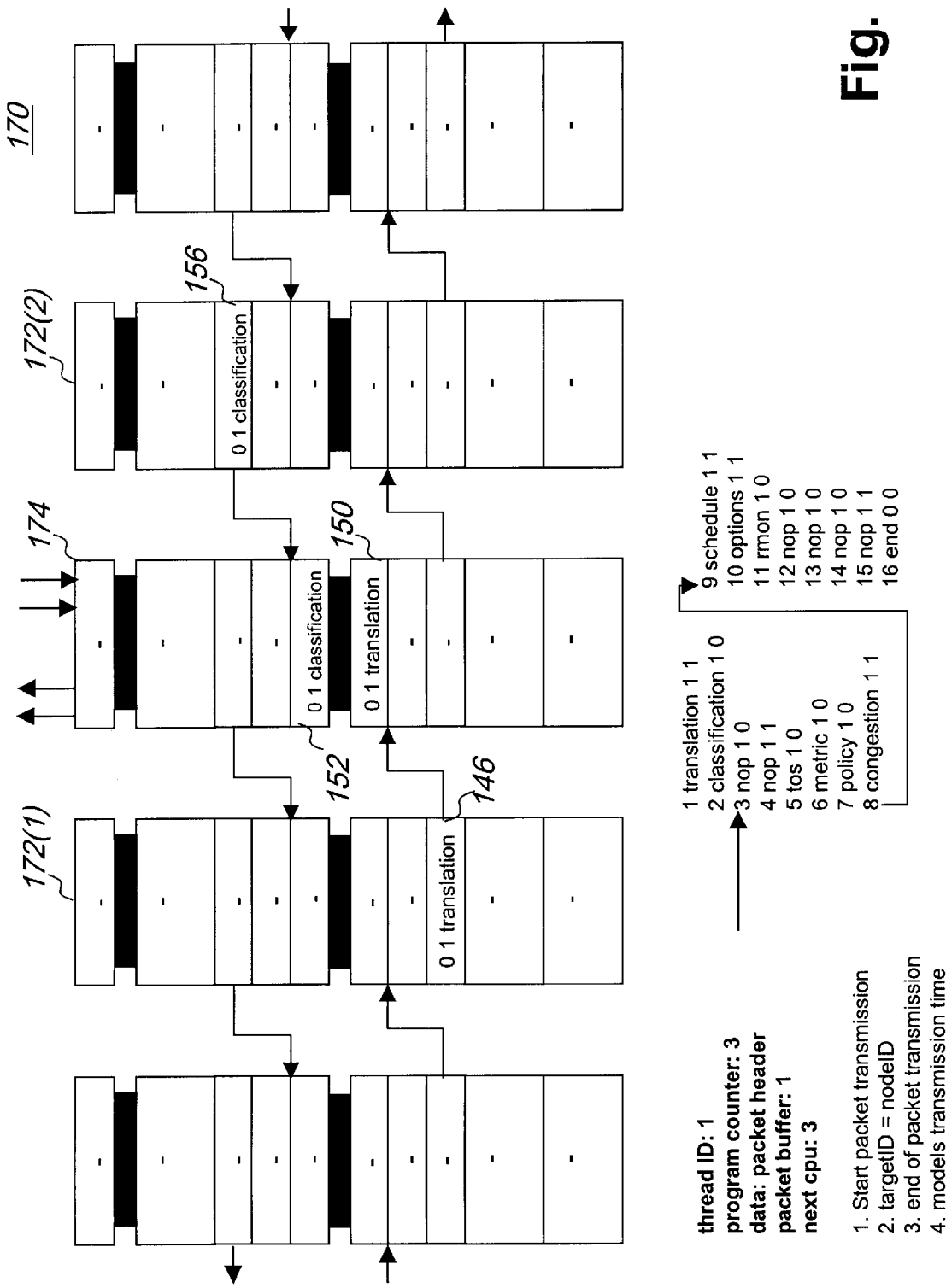
FIG. 16 is a block diagram showing operation of the data packet processing system shown in FIG. 10.

Responses containing the translation and classification results are loaded into the respective transmit FIFOs 142, 144, as shown in FIG. 15, and then forwarded by the respective transmitter 146, 156 to the respective receivers 150, 152 of the master node 174, as shown in FIG. 16.

Figure 17:
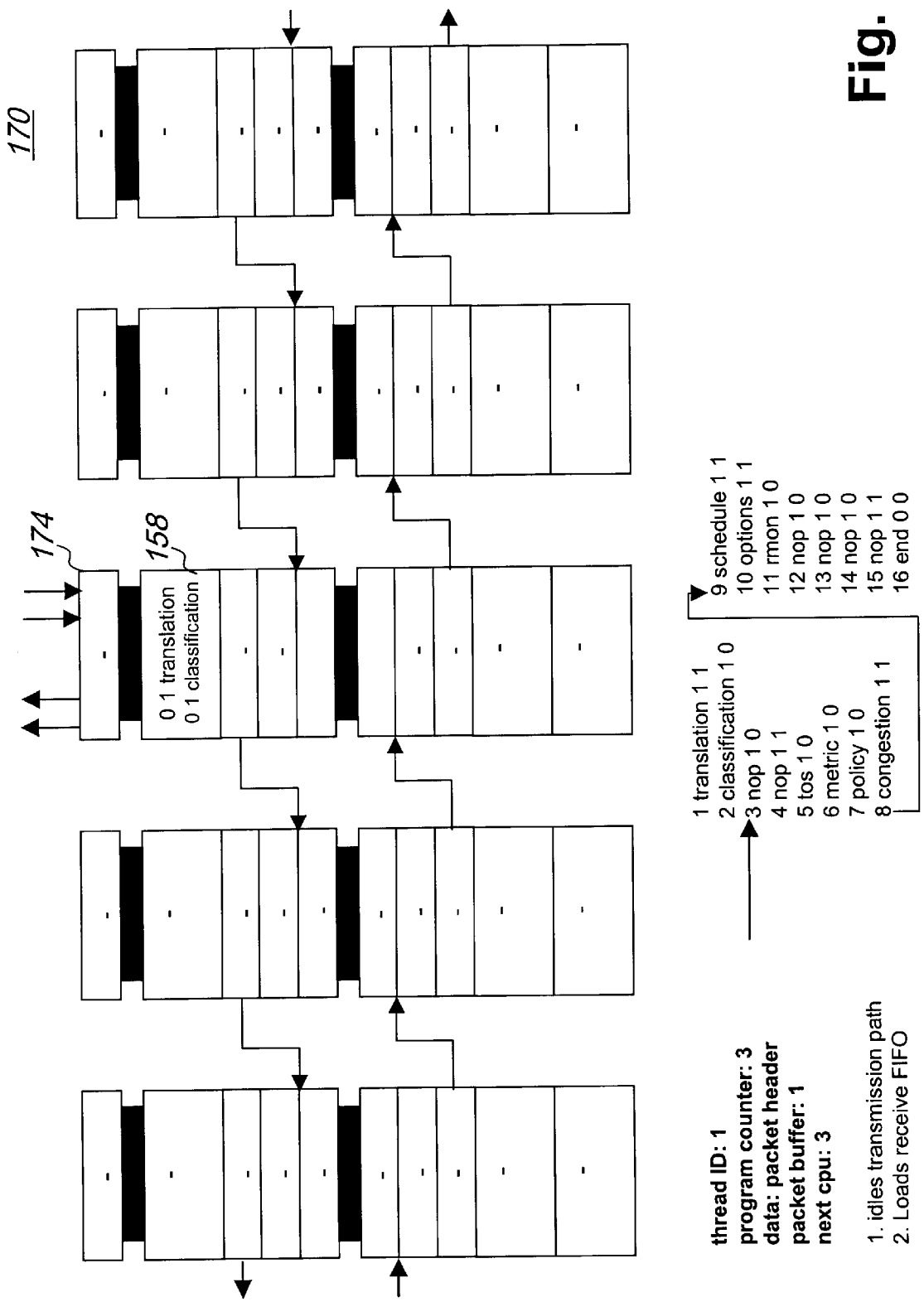
FIG. 17 is a block diagram showing operation of the data packet processing system shown in FIG. 10.

As shown in FIG. 17, the responses once received are loaded into the receive FIFO 158 of the master node 174. The ordering of the responses is not critical as two "nop" codes (no operation) are sequenced at addresses 3 and 4 of the main forwarding program before any further action is taken. At which time the master node 174 has both synchronized responses.

Figure 18:
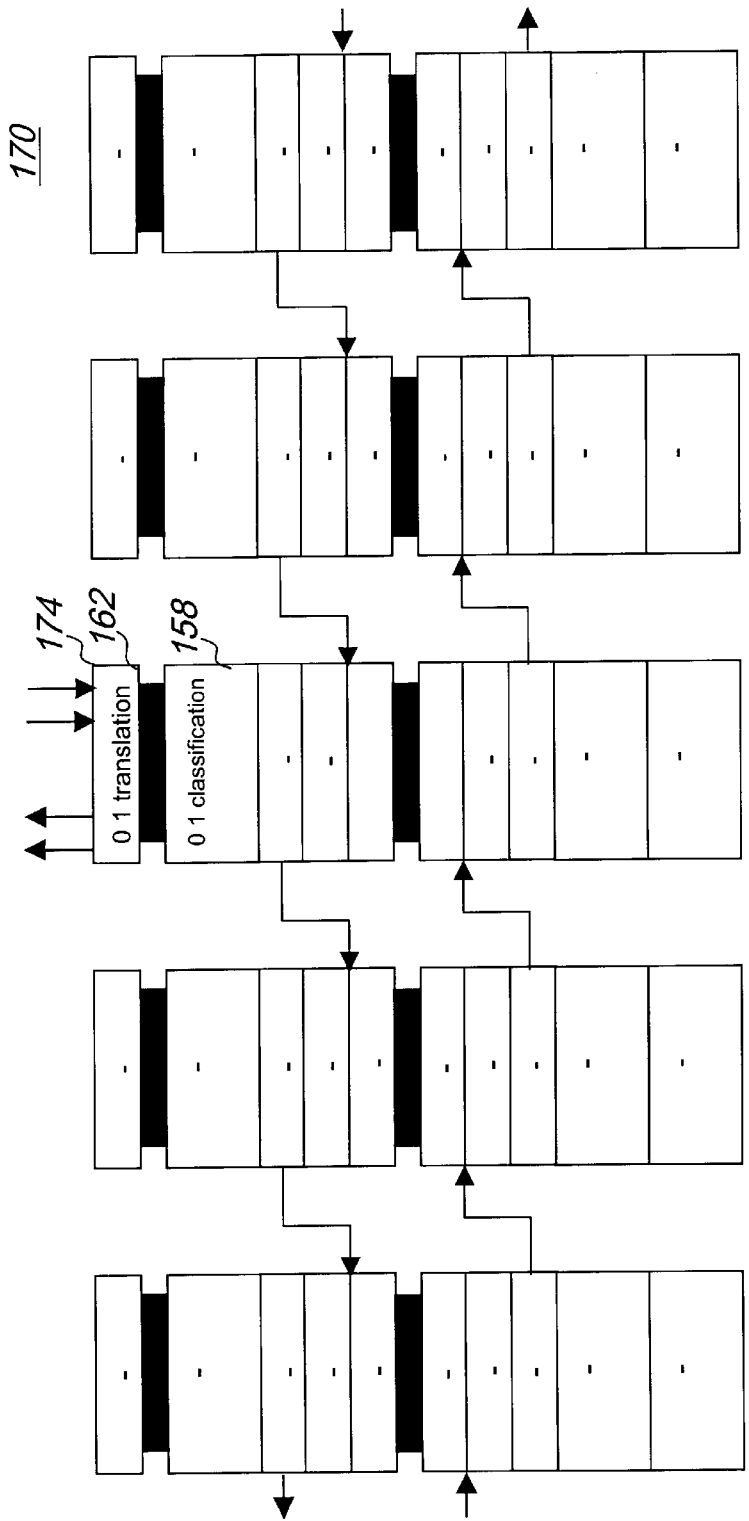
FIG. 18 is a block diagram showing operation of the data packet processing system shown in FIG. 10.
Figure 19:
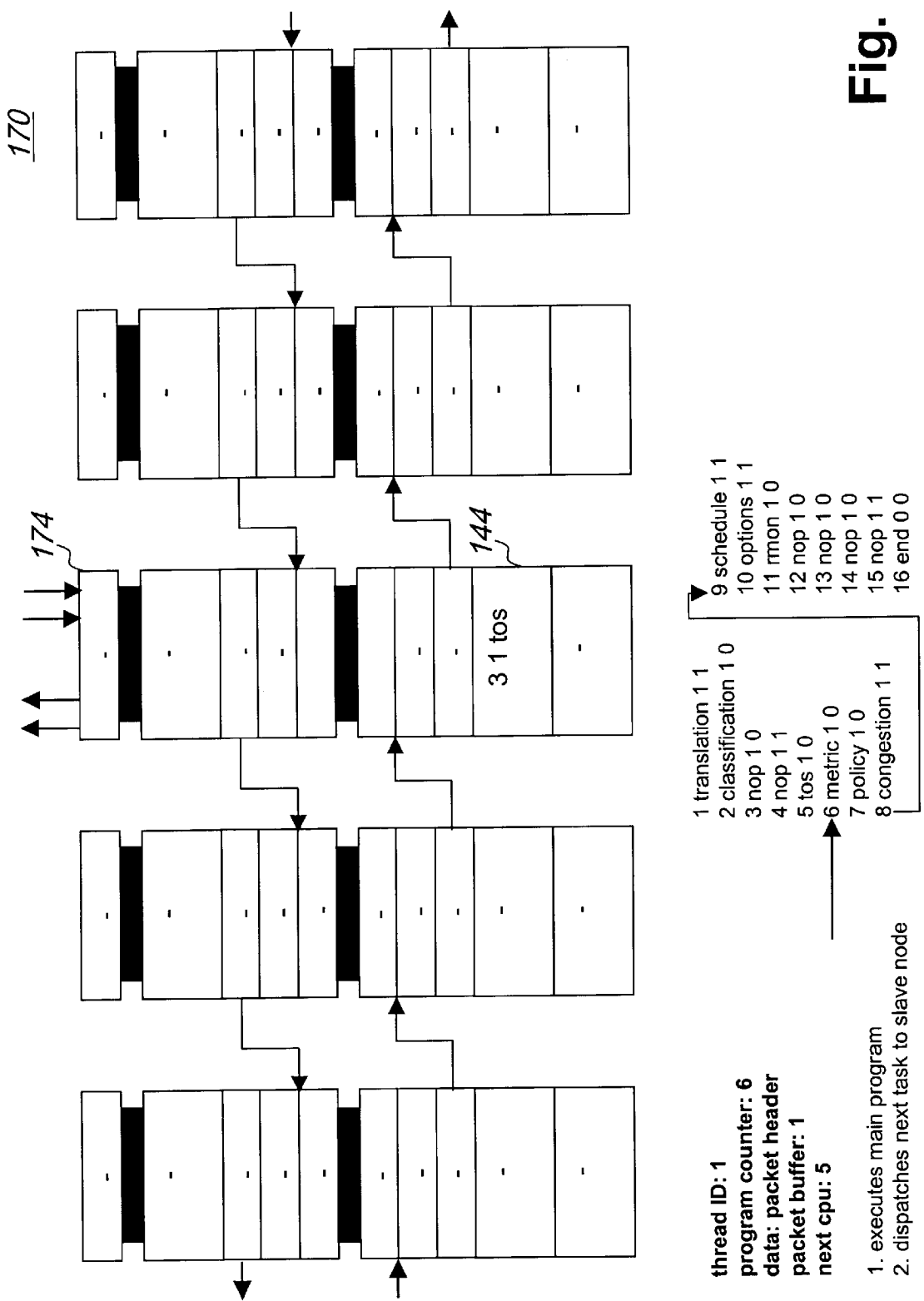
FIG. 19 is a block diagram showing operation of the data packet processing system shown in FIG. 10.

As shown in FIGS. 18 and 19, the translation and classification responses are processed by RISC 162, resulting in a further request being made due to the procedural call "tos" located at address 5 of the main program.

Figure 20:
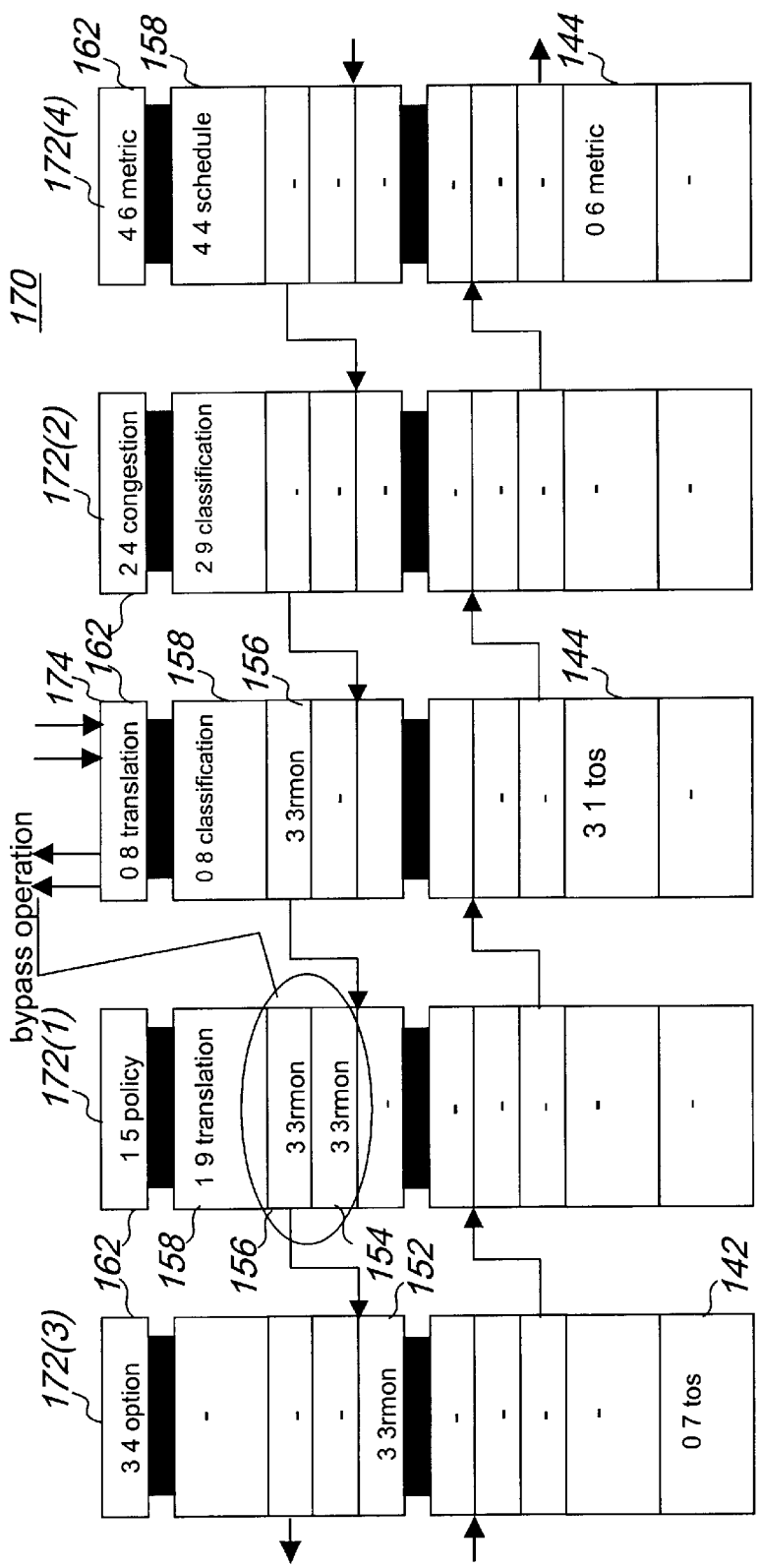
FIG. 20 is a block diagram showing operation of the data packet processing system shown in FIG. 10.

As shown in FIG. 20, once the input arrivals exceed the throughput, the data packet processing system reaches a congested state where one or more of the instruction FIFOs 142, 144, 158 always have a pending request. Consequently, the slave nodes have a continuous flow of tasks resulting in 100% utilization of the multiprocessor array.

The above description was made mainly using a ringlet topology, but the present invention may be also applied in cluster topology or other suitable topologies.

Figure 22:
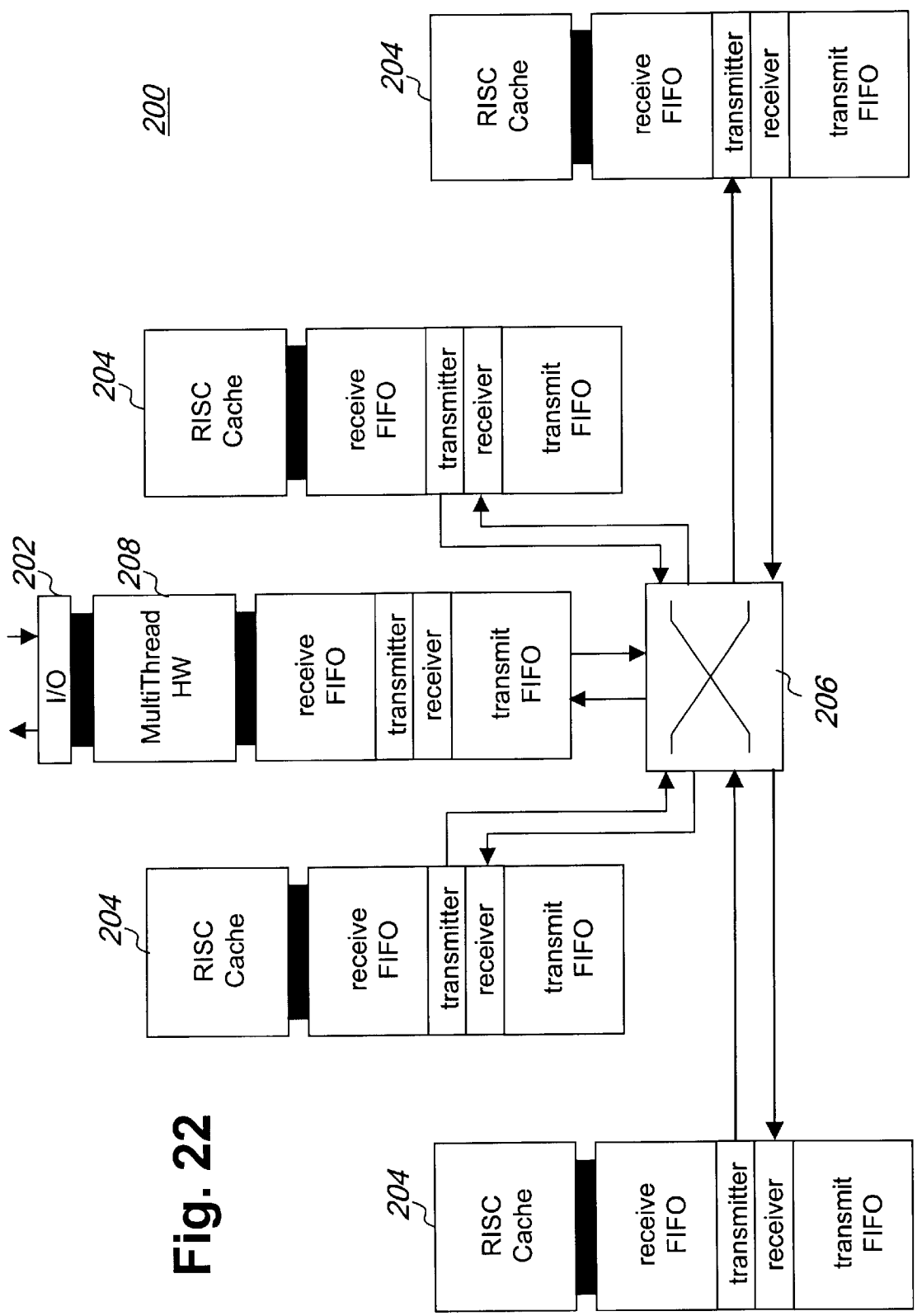
FIG. 22 is a block diagram showing another embodiment of a data packet processing system in accordance with the present invention using a cluster topology.

FIG. 22 shows another embodiment of a packet processing system 200 using a cluster topology. A master node 202 and four slave nodes 204 are connected through a switch 206 to form a cluster. The main forwarding program is loaded in a memory of an RISC 208 of the master node 202 which creates multithread hardwares as a data packet enters the system 200.

As described above, the packet processing system having multithreaded hardware of the present invention allows an array of commercial RISC processors to operate as a parallel array that linearly scales the processing throughput needed for software packet switching programs operating at wire speeds of OC-12,48,192. The architecture for parallel processing restores the conventional model for building data packet processing system functionality in software.

For OC-12 and OC-48, a ringlet topology provides adequate latency performance whereas at an OC-192 wire rate a linear addition of processors is made using a switching matrix to reduce communication latency within a cluster of CPU nodes.

Figure 23:
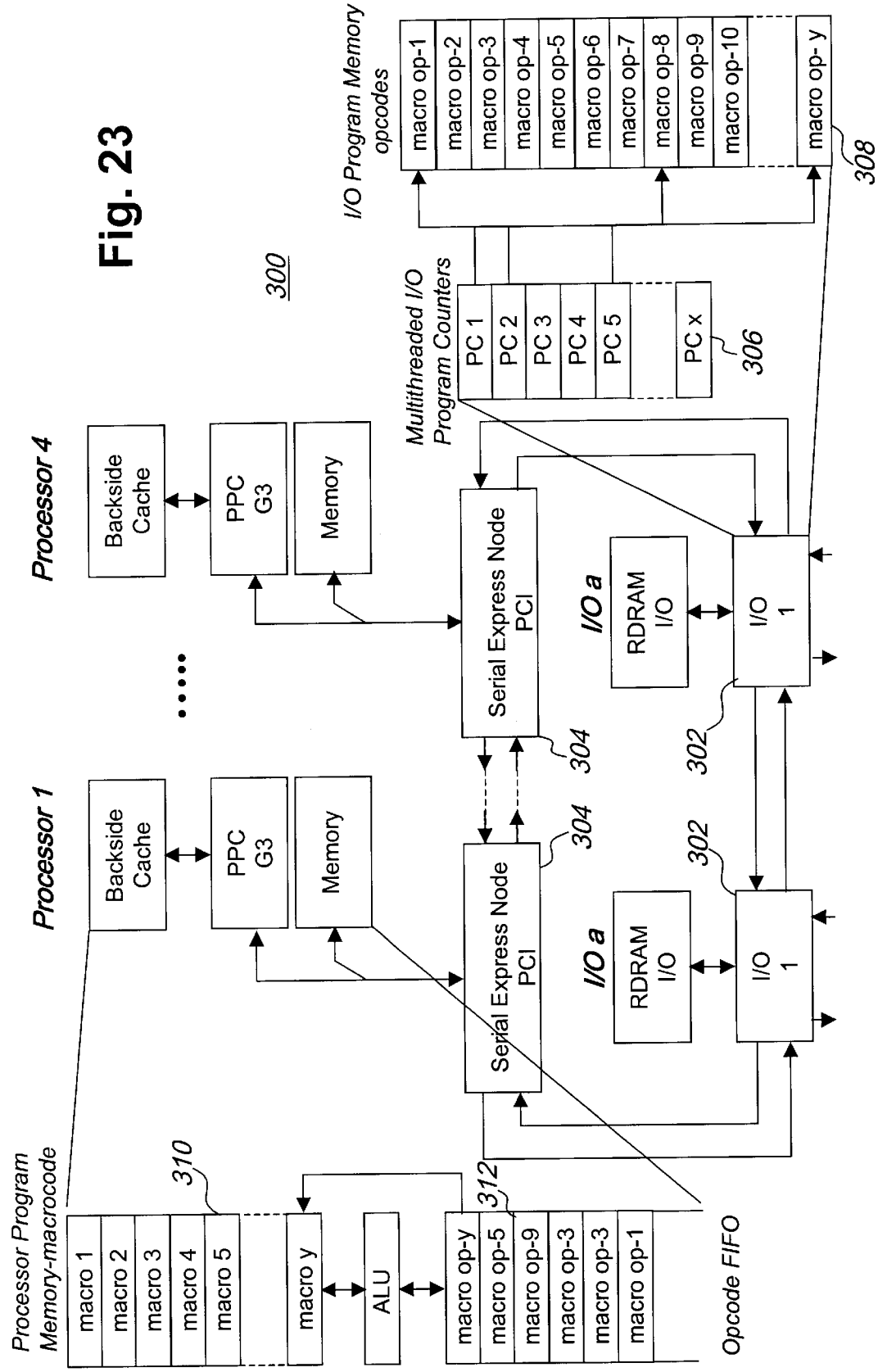
FIG. 23 is a block diagram showing another embodiment of a data packet processing system in accordance with the present invention suitably used for a wire speed at OC-48.

FIG. 23 shows an example of a packet processing system 300 which is suitably used for OC-48. Two master I/O nodes 302 are connected to multiple Serial Express nodes 304 to form a ringlet topology. Each I/O node 302 is loaded with the main forwarding program in an I/O program memory 308. As data packets enter the system, program counters 306 are created which read opcodes from the memory 308 in accordance with the program counters. Each Serial Express Node 304 is loaded with a set of procedure macros in a processor program memory 310. It receives opcodes from the I/O nodes in an opcode FIFO 316 for execution using the procedure macros stored in the memory 310.

While particular embodiments of the present invention have been shown and described, changes and modifications may be made to such embodiments without departing from the true scope of the invention. For example, in the above embodiments, all slave nodes in a processor array are loaded with the same object library containing a set of procedures. However, a particular slave node may be dedicated to a particular set of procedures that are not in the object library. The object library may be permanently stored in the slave nodes or erased or changed as desired for e.g. conserve power or to perform diagnostics when the system is lightly loaded.

What is claimed is:

1. A data packet processing system for a router which uses a packet switching software for routing data packets between data networks, the data packet processing system comprising:

a master node and a processor array of multiple slave nodes;

the master node having:
- a memory for storing a main forwarding program of the packet switching software;
- an input/output unit for receiving and transmitting data packets;
- a processing unit for assigning a program counter to each data packet when the data packet is received, the program counter defining a sequence of procedural calls in the main forwarding program;
- a transmitter for transmitting each procedural call to one of the slave nodes in accordance with the program counter;
- a receiver for receiving responses from the slave nodes; and each slave node having:
- a memory for storing a set of procedures of the packet switching software;
- a receiver for receiving procedural calls destined to the slave node;
- a processing unit for executing the received procedural calls using the set of procedures loaded in the memory of the slave node to generate a response to each received procedural call; and
- a transmitter for returning the response to the master node.

2. A data packet processing system as claimed in claim 1 wherein the processing unit of the master node create a hardware thread in association with the program counter by which the data packet is processed.

3. A data packet processing system as claimed in claim 1 wherein the processing unit of the master node has a selector which selects least loaded slave nodes so that the transmitter of the master node transmits a procedural call to one of the least loaded slave nodes.

4. A data packet processing system as claimed in claim 1 wherein the transmitter of the master node transmits multiple procedural calls to multiple slave nodes so that the multiple procedural calls are executed by the multiple slave nodes in parallel.

5. A data packet processing system as claimed in claim 4 wherein the transmitter of the master node transmits the multiple procedural calls derived from a single program counter.

6. A data packet processing system as claimed in claim 4 wherein the transmitter of the master node transmits the multiple procedural calls derived from multiple program counters assigned to multiple data packets.

7. A data packet processing system as claimed in claim 4 wherein the transmitter of the master node transmits the multiple procedural calls concurrently.

8. A data packet processing system as claimed in claim 4 wherein the transmitter of the master node transmits the multiple procedural calls separately so that a procedural call is transmitted before the master node receives a response for a procedural call previously transmitted.

9. A data packet processing system as claimed in claim 1 wherein the transmitter of the master node transmits data packet parameters and a code associated with the procedural call for executing the procedural call.

10. A data packet processing system as claimed in claim 1 wherein the processing unit of the master node includes means for advancing the program counter to a next instruction call in the sequence of the procedural calls when the response is received by the master node.

11. A method for data packet processing for a router which uses a packet switching software for routing data packets between data networks, the method comprising the steps of:

(a) providing a multiprocessor system comprising a master node and a processor array of multiple slave nodes in the router;

(b) partitioning the packet switching software into a main forwarding program and a set of procedures;

(c) storing the main forwarding program in the master node;

(d) loading the set of procedures in each slave node;

(e) receiving data packets by the master node;

(f) assigning a program counter to each data packet when the data packet is received, the program counter defining a sequence of procedural calls in the main forwarding program;

(g) forwarding each procedural call to one of the slave nodes in accordance with the program counter;

(h) receiving and executing the procedural call by the one of the slave nodes using the set of procedures loaded therein to generate a response;

(i) returning the response to the master node from the one of the slave nodes; and (j) repeating the steps of (g) to (i) until the program counter reaches its end for each data packet.

12. A data packet processing system as claimed in claim 11 wherein the step (f) creates a hardware thread in association with the program counter by which the data packet is processed.

13. A method as claimed in claim 11 wherein the step (g) comprises the steps of:

selecting least loaded slave nodes; and forwarding a procedural call to one of the least loaded slave nodes.

14. A method as claimed in claim 11 wherein the step (g) transmits another procedural call to another slave node before receiving a response for a procedural call transmitted previously so that multiple procedural calls are executed by multiple slave nodes in parallel.

15. A method as claimed in claim 14 wherein the step (g) transmits the multiple procedural calls derived from a single program counter.

16. A method as claimed in claim 14 wherein the step (g) transmits the multiple procedural calls derived from multiple program counters assigned to multiple data packets.

17. A method as claimed in claim 14 wherein the step (g) transmits the multiple procedural calls concurrently.

18. A method as claimed in claim 14 wherein the step (g) transmits the multiple procedural calls separately.

19. A method as claimed in claim 11 wherein the step (g) transmits data packet parameters and a code associated with the procedural call for executing the procedural call.

20. A method as claimed in claim 11 further comprising the step of advancing the program counter to a next instruction call in the sequence of the procedural calls when the response is returned to the master node.

21. A data packet processing system for a router which uses a packet switching software for routing data packets between data networks, the data packet processing system comprising:

a master node and a processor array of multiple slave nodes;

the master node having:
- a memory for storing a main forwarding program of the packet switching software;
- an input/output unit for receiving and transmitting data packets;
- a processing unit for assigning a program counter to each data packet when the data packet is received, the program counter defining a sequence of procedural calls in the main forwarding program;

a selector for selecting least loaded slave nodes;

a transmitter for transmitting a procedural call to one of the least loaded slave nodes in accordance with the program counter;

a receiver for receiving responses from the slave nodes; and each slave node having:

a memory for storing a set of procedures of the packet switching software;

a receiver for receiving procedural calls destinated to the slave node;

a processing unit for executing the received procedural calls using the set of procedures loaded in the memory of the slave node to generate a response to each received procedural call; and a transmitter for returning the response to the master node.

22. A data packet processing system as claimed in claim 21 wherein the selector uses a round robbing selection for selecting the least loaded slave nodes.

23. A data packet processing system as claimed in claim 21 wherein the processing unit of the slave node has means for generating a fill status indicating a filling rate of the slave node with pending procedural calls, and the transmitter of the slave node forwards the fill status to the master node.

24. A data packet processing system as claimed in claim 23 wherein the selector of the master node selects the least loaded slave nodes in view of the fill status forwarded by each slave node.

25. A data packet processing system as claimed in claim 21 wherein the receiving of each slave node comprises an first-in-first-out buffer for queuing the procedural calls.

26. A data packet processing system as claimed in claim 21 wherein the transmitter of the master node transmits multiple procedural calls to multiple slave nodes so that the multiple procedural calls are executed by the multiple slave nodes in parallel.

27. A data packet processing system as claimed in claim 26 wherein the transmitter of the master node transmits the multiple procedural calls derived from a single program counter.

28. A data packet processing system as claimed in claim 26 wherein the transmitter of the master node transmits the multiple procedural calls derived from multiple program counters assigned to multiple data packets.

29. A data packet processing system as claimed in claim 26 wherein the transmitter of the master node transmits the multiple procedural calls concurrently.

30. A data packet processing system as claimed in claim 26 wherein the transmitter of the master node transmits the multiple procedural calls separately so that a procedural call is transmitted before the master node receives a response for a procedural call previously transmitted.

31. A method for data packet processing for a router which uses a packet switching software for routing data packets between data networks, the method comprising the steps of:

(a) providing a multiprocessor system comprising a master node and a processor array of multiple slave nodes in the router;

(b) partitioning the packet switching software into a main forwarding program and a set of procedures;

(c) storing the main forwarding program in the master node;

(d) loading the set of procedures in each slave node;

(e) receiving data packets by the master node;

(f) assigning a program counter to each data packet when the data packet is received, the program counter defining a sequence of procedural calls in the main forwarding program;

(g) selecting least loaded slave nodes, and forwarding a procedural call to one of the least loaded slave nodes in accordance with the program counter;

(h) receiving and executing the procedural call by the one of the least loaded slave nodes using the set of procedures loaded therein to generate a response;

(i) returning the response to the master node from the one of the slave nodes; and (j) repeating the steps of (g) to (i) until the program counter reaches its end for each data packet.

32. A method as claimed in claim 31 wherein the step (g) selects the least loaded slave nodes using a round robbing selection.

33. A method as claimed in claim 31 wherein the step (i) further returns a fill status indicating a filling rate of the slave node with pending procedural calls.

34. A method as claimed in claim 33 wherein the step (g) selects the least loaded slave nodes in view of the fill status returned by each slave node.

35. A method as claimed in claim 31 wherein the step (h) comprises the step of queuing the procedural calls in an first-in-first-out buffer.

36. A method as claimed in claim 31 wherein the step (g) transmits another procedural call to another slave node before receiving a response for a procedural call transmitted previously so that multiple procedural calls are executed by multiple slave nodes in parallel.

37. A method as claimed in claim 36 wherein the step (g) transmits the multiple procedural calls derived from a single program counter.

38. A method as claimed in claim 36 wherein the step (g) transmits the multiple procedural calls derived from multiple program counters assigned to multiple data packets.

39. A method as claimed in claim 36 wherein the step (g) transmits the multiple procedural calls concurrently.

40. A method as claimed in claim 36 wherein the step (g) transmits the multiple procedural calls separately.

* * * * *